United States Patent
Kakitsuba

(10) Patent No.: US 11,244,213 B2
(45) Date of Patent: Feb. 8, 2022

(54) NON-TRANSITORY COMPUTER READABLE STORAGE MEDIUM, INFORMATION PROCESSING DEVICE AND PRINTING METHOD FOR CONTROLLING A PRINTER

(71) Applicant: BROTHER KOGYO KABUSHIKI KAISHA, Nagoya (JP)

(72) Inventor: Ryota Kakitsuba, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/211,195

(22) Filed: Mar. 24, 2021

(65) Prior Publication Data

US 2021/0209429 A1 Jul. 8, 2021

Related U.S. Application Data

(63) Continuation of application No. PCT/JP2020/025799, filed on Jul. 1, 2020.

(30) Foreign Application Priority Data

Sep. 27, 2019 (JP) .............................. JP2019-177592

(51) Int. Cl.
*G06K 15/02* (2006.01)
*G06F 3/12* (2006.01)
*H04N 1/23* (2006.01)

(52) U.S. Cl.
CPC ....... *G06K 15/1805* (2013.01); *G06F 3/1204* (2013.01); *G06F 3/1231* (2013.01);
(Continued)

(58) Field of Classification Search
CPC ........... G06K 15/1805; G06K 15/1809; G06K 15/1836; G06F 3/1204; G06F 3/1231; G06F 3/12; H04N 1/2369; H04N 1/387
See application file for complete search history.

(56) References Cited

U.S. PATENT DOCUMENTS

| 9,519,850 B2 * | 12/2016 | Minegishi ............. G06F 3/1252 |
| 2006/0238777 A1 * | 10/2006 | Anno ................... H04N 1/0032 358/1.1 |

(Continued)

FOREIGN PATENT DOCUMENTS

| JP | 2004-347627 A | 12/2004 |
| JP | 2006-224328 A | 8/2006 |

(Continued)

OTHER PUBLICATIONS

International Search Report with translation and Written Opinion with partial translation dated Sep. 1, 2020 from related PCT/JP2020/025799.

*Primary Examiner* — Juan M Guillermety

(74) *Attorney, Agent, or Firm* — Scully, Scott, Murphy & Presser, PC

(57) ABSTRACT

A printer is caused to perform duplex printing by an information processing device in which an OS standard printing program is installed. When causing a printer connected to a PC to execute duplex printing based on a print instruction output from an editing application installed in the PC, an auxiliary program that supports the printer executes rotation processing of rotating an image of a page, which is required to be rotated, by 180° for intermediate data received from a general-purpose print program, executes rearrangement processing of rearranging a processing order from a page order to a print order for print data received from the general-purpose print program, according to a sheet conveying aspect of the printer, and transmits the print data after the rotation processing and the rearrangement processing from the PC to the printer.

25 Claims, 12 Drawing Sheets

(52) U.S. Cl.
CPC ..... *G06K 15/1809* (2013.01); *G06K 15/1836* (2013.01); *H04N 1/2369* (2013.01)

(56) References Cited

U.S. PATENT DOCUMENTS

| | | | |
|---|---|---|---|
| 2017/0223225 A1* | 8/2017 | Kaneda | ................ H04N 1/0044 |
| 2017/0339306 A1 | 11/2017 | Fukui et al. | |
| 2019/0050183 A1 | 2/2019 | Inoue | |
| 2020/0012460 A1* | 1/2020 | Shibamori | .............. G06F 3/125 |

FOREIGN PATENT DOCUMENTS

| | | |
|---|---|---|
| JP | 2007-098724 A | 4/2007 |
| JP | 2017-207993 A | 11/2017 |
| JP | 2018-028817 A | 2/2018 |

\* cited by examiner

FIG. 2

| MODEL NAME | CONVEYING METHOD | REARRANGEMENT NECESSITY/UNNECESSITY INFORMATION |
|---|---|---|
| M1 | ONE-SHEET CONVEYING METHOD | NECESSITY |
| M2 | TWO-SHEET SIMULTANEOUS CONVEYING METHOD | NECESSITY |
| M3 | INTERLEAVE METHOD | UNNECESSITY |

NON-TRANSITORY COMPUTER READABLE STORAGE MEDIUM, INFORMATION PROCESSING DEVICE AND PRINTING METHOD FOR CONTROLLING A PRINTER

CROSS-REFERENCE TO RELATED APPLICATIONS

This is a continuation application of International Application No. PCT/JP2020/025799 filed on Jul. 1, 2020 which claims priority from Japanese Patent Application No. 2019-177592 filed on Sep. 27, 2019. The entire contents of the earlier applications are incorporated herein by reference.

TECHNICAL FIELD

A technical field disclosed in the present specification relates to non-transitory computer readable medium that stores a support program for supporting control on a printer, an information processing device, and a printing method.

BACKGROUND

As technology of controlling a printer from an information processing device such as a personal computer, for example, known is a configuration where a printer driver inputs, to the printer, a job in which duplex printing for printing on both surfaces of a front surface and a back surface of one sheet is set.

In recent years, technology of controlling a printer by a printing program standardly installed in an operating system (OS), without using the above-described printer driver, is put into practical use. In the technology, the OS associates the printer and the OS standard printing program, and when a print instruction for the printer is received thereafter, printing by the OS standard printing program can be performed without using the printer driver.

However, when performing printing by an OS standard general-purpose print program, setting items that can be selected when selecting printing parameters are general items registered in the OS standard printing program. For this reason, the duplex printing may not be supported, which causes user's inconvenience.

SUMMARY

The present specification discloses technology by which an information processing device having an OS standard printing program installed therein causes a printer to execute duplex printing.

Disclosed here is A non-transitory computer readable storage medium that stores a support program executable by a computer included in an information processing device, the support program being corresponding to a printer connected to the information processing device, in a case where a print instruction that is output from an application program installed in the information processing device and that causes the printer to execute printing of an image is sent to a general-purpose print program installed in advance in an operating system of the information processing device to cause the printer to execute duplex printing in a job based on the print instruction, the support program causing the computer to execute: receiving first data from the general-purpose print program, and rotation processing of executing, for the received first data, image processing of rotating the image of a page required to be rotated by 180°, the first data being one of intermediate print data of the image having a plurality of pages relating to the job and print data rasterized by the general-purpose print program based on the intermediate print data; receiving second data from the general-purpose print program, and rearrangement processing of rearranging a processing order from a page order to a print order according to a sheet conveying aspect of the printer, the second data being the other of the intermediate print data and the print data; and output processing of outputting the print data relating to the job after the rotation processing and the rearrangement processing such that the print data is transmitted from the information processing device to the printer as a transmission destination.

In a case where the print instruction is sent to the general-purpose print program (OS) and the printer is caused to execute duplex printing in a job based on the print instruction, the support program configured as described above causes the computer to execute the rotation and the rearrangement for the intermediate print data or the print data, thereby setting a print order according to the conveying aspect of the printer sheet. Thereby, even when the general-purpose print program does not support the duplex printing, it is possible to support the duplex printing.

Another aspect of the present disclosure is a non-transitory computer readable storage medium that stores a support program executable by a computer included in an information processing device, the support program being corresponding to a printer connected to the information processing device, in a case where a print instruction that is output from an application program installed in the information processing device and that causes the printer to execute printing of an image is sent to a general-purpose print program installed in advance in an operating system of the information processing device to cause the printer to execute duplex printing in a job based on the print instruction, the support program causing the computer to execute: receiving intermediate print data of the image having a plurality of pages relating to the job from the general-purpose print program, and for the received intermediate print data, both of rotation processing of executing image processing of rotating the image of a page required to be rotated by 180° and rearrangement processing of rearranging a processing order from a page order to a print order according to a sheet conveying aspect of the printer; and output processing of transferring the intermediate print data for which the rotation processing and the rearrangement processing have been executed to the general-purpose print program such that the print data relating to the job after the rotation processing and the rearrangement processing is transmitted from the information processing device to the printer as a transmission destination.

Another aspect of the present disclosure is A non-transitory computer readable storage medium that stores a support program executable by a computer included in an information processing device, the support program being corresponding to a printer connected to the information processing device, in a case where a print instruction that is output from an application program installed in the information processing device and that causes the printer to execute printing of an image is sent to a general-purpose print program installed in advance in an operating system of the information processing device to cause the printer to execute duplex printing in a job based on the print instruction, the support program causing the computer to execute: receiving print data rasterized by the general-purpose print program from the general-purpose print program, and for the received print data, both of rotation processing of executing image processing of rotating the image of a page required to be rotated by 180° and rearrangement processing of rearranging a processing order from a page order to a print order according to a sheet conveying aspect of the printer; and output processing of outputting the print data relating to the job after the rotation processing and the rearrangement processing such that the print data is transmitted from the information processing device to the printer as a transmission destination.

Another aspect of the present disclosure is A non-transitory computer readable storage medium that stores a support program executable by a computer included in an information processing device, the support program being corresponding to a printer connected to the information processing device, in a case where a print instruction that is output from an application program installed in the information processing device and that causes the printer to execute printing of an image is sent to a general-purpose print program installed in advance in an operating system of the information processing device to cause the printer to execute duplex printing in a job based on the print instruction, the support program causing the computer to execute: acquisition processing of acquiring intermediate print data of the image having a plurality of pages relating to the job from the general-purpose print program; rasterization processing of rasterizing the intermediate print data acquired in the acquisition processing to acquire print data; rotation processing of executing, for the intermediate print data or the print data, image processing of rotating the image of a page required to be rotated by 180°; rearrangement processing, for the intermediate print data or the print data, of rearranging a processing order from a page order to a print order according to a sheet conveying aspect of the printer; and output processing of outputting the print data relating to the job after the rotation processing and the rearrangement processing such that the print data is transmitted from the information processing device to the printer as a transmission destination.

A control method and an information processing device for implementing the functions of the support program are also novel and useful.

According to the technology disclosed in the present specification, it is possible to cause the printer to execute the duplex printing by the information processing device in which the OS standard printing program is installed.

BRIEF DESCRIPTION OF DRAWINGS

Aspects of the disclosure are illustrated by way of example and not by limitation in the accompanying figures in which like reference characters indicate similar elements.

FIG. 2 depicts is an example of a configuration of an auxiliary DB.

DETAILED DESCRIPTION

Hereinbelow, a personal computer (hereinbelow, referred to as "PC") that uses a program of a first aspect will be described in detail with reference to the accompanying drawings. The present aspect is to disclose an embodiment in which a program, which is executed in the PC connected to a printer having a printing function, is implemented.

Figure 1:
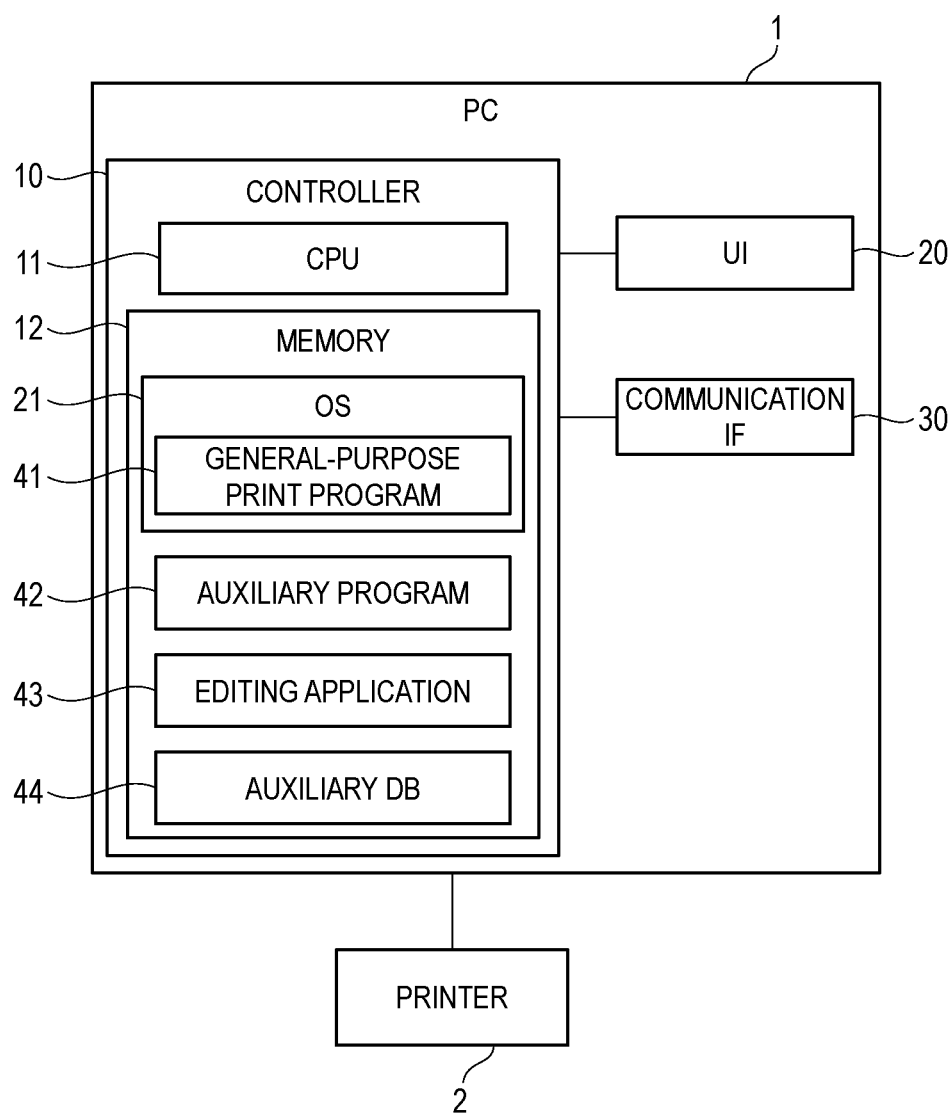
FIG. 1 is a block diagram depicting an electrical configuration of a PC.

As shown in FIG. 1, a PC 1 of the present aspect includes a controller 10, a user interface (hereinbelow referred to as "UI") 20, and a communication interface (hereinbelow referred to as "communication IF") 30. The UI 20 and the communication IF 30 are electrically connected to the controller 10. The PC 1 is an example of the information processing device. The printer 2 is an apparatus having a printing function, and is connected to the PC 1 via local communication or network communication. The printer 2 of the present aspect has a function of automatically performing duplex printing. The duplex printing will be described later.

The UI 20 includes hardware for performing a variety of displays and receiving a user's instruction input. The UI 20 may be a touch panel having both a display function and an input receiving function or may be a combination of a display having a display function and a keyboard, a mouse and the like each having an input receiving function.

The communication IF 30 includes hardware for performing communication with an external device such as the printer 2 and hardware for accessing the Internet. The communication IF 30 may also include a plurality of interfaces having different communication methods. The communication methods include network communication and USB communication, for example. Also, wired communication and wireless communication are possible.

The controller 10 includes a CPU 11 and a memory 12. The CPU 11 is an example of the computer. The memory 12 includes a ROM, a RAM, and a non-volatile memory, and stores programs such as diverse application programs (hereinbelow, referred to as "application"), a variety of data, and the like. The CPU 11 is configured to execute a variety of processing, in accordance with a program read out from the memory 12 and based on a user's instruction. Note that, the controller 10 in FIG. 1 is a collective term for hardware and software that are used for control of the PC 1, and does not necessarily represent single hardware that is actually provided in the PC 1.

An example of the memory 12 may also be a computer-readable storage medium. The computer-readable storage medium is a non-transitory medium. The non-transitory medium includes a recording medium such as a CD-ROM and a DVD-ROM, in addition to the above examples. Also, the non-transitory medium is a tangible medium. Note that, electric signals for conveying a program that is downloaded from a server on the Internet are a computer-readable signal medium that is a type of the computer-readable medium but are not included in the computer-readable non-transitory storage medium.

As shown in FIG. 1, an OS 21 including a general-purpose print program 41, an auxiliary program 42, and an editing application 43 are stored in the memory 12, for example. The auxiliary program 42 is an example of the support program. The editing application 43 is an example of the application program. The OS 21 is, for example, Microsoft Windows (registered trademark), Mac OS (registered trademark), or Linux (registered trademark). Note that a variety of data including information of the connected printer 2, and a variety of programs such as a browser are stored in the memory 12 in addition to the shown ones.

The general-purpose print program 41 is an OS standard program for causing a variety of printers such as the printer 2 to execute printing in response to an instruction from the PC 1. The general-purpose print program 41 of the present aspect is a program including a function of generating print data, which is used for printing by a corresponding printer, based on image data of a print target.

The general-purpose print program 41 is configured to support a function that can be commonly used by a plurality of models of printers provided by vendors of diverse printers. The general-purpose print program 41 is difficult to support all functions that the diverse printers inherently have, and a function that is supported by the general-purpose print program 41 is limited to a general-purpose function.

The auxiliary program 42 is a program or a program group configured to execute processing based on an instruction from the OS 21 in association with activation of the general-purpose print program 41, and is an application configured to support control of target hardware. The auxiliary program 42 of the present aspect supports a model of the printer 2 connected to the PC 1, and is activated from the general-purpose print program 41 when an instruction to cause the printer 2 to execute printing by using the general-purpose print program 41 is received, for example. The auxiliary program 42 is referred to as a hardware support application (abbreviated as HSA), for example.

The auxiliary program 42 is configured to receive a plurality of kinds of commands from the general-purpose print program 41 and to execute a variety of processing, based on the received commands. The auxiliary program 42 can execute different processing, according to contents of execution commands from the general-purpose print program 41. Note that, the auxiliary program 42 may also be a combination of a plurality of programs each of which is configured to receive an execution command, or one program capable of executing different processing, according to commands.

Note that, the auxiliary program may also be a program that is prepared for each type of printers by the vendors of the printers. For example, an auxiliary program for an inkjet printer and an auxiliary program for a laser printer are prepared. The vendor of the printer registers the auxiliary program in a platform that is provided by a vendor of the OS 21, according to a procedure designated by the vendor of the OS 21. When a new printer is connected to the PC 1 and an auxiliary program corresponding to the printer has been registered, the OS 21 downloads the auxiliary program from a server in which the auxiliary program is stored and installs the auxiliary program into the PC 1. Then, the OS 21 stores identification information of the installed auxiliary program in the memory 12, in association with printer information of the newly connected printer. The auxiliary program is not limited to each type of printers, and may also be prepared for each model of printers or each series of printers.

In the OS 21, an auxiliary database (hereinbelow, referred to as "auxiliary DB") 44 is installed in a storage area for the auxiliary program 42 prepared in the memory 12, in association with the auxiliary program 42. An example of a configuration of the auxiliary DB 44 is described with reference to FIG. 2. The auxiliary DB 44 is a database in which a model name, a conveying method, and rearrangement necessity/unnecessity information are stored and associated for all models that the auxiliary program 42 can support.

The model name indicates a model of a printer. The model name is an example of the model information. The conveying method indicates a method by which a conveying mechanism of a printer conveys a sheet. In the conveying method, for example, a one-sheet conveying method, a two-sheet simultaneous conveying method, and an interleave method are stored. The conveying methods will be described later. Note that, the conveying method is an example of the conveying aspect. The rearrangement necessity/unnecessity information is information indicating whether it is necessary to rearrange a processing order that is an order for processing images of pages. For example, for a model of a printer that has a small memory capacity and cannot implement duplex printing by changing a print order in the printer itself, for example, "necessity" indicating that it is necessary to rearrange the processing order is stored in association with a model name, in the rearrangement necessity/unnecessity information. On the other hand, for a model of a printer that has a large memory capacity and can implement duplex printing by changing a print order in the printer itself, for example, "unnecessity" indicating that it is not necessary to rearrange the processing order is stored in association with a model name, in the rearrangement necessity/unnecessity information.

Returning to FIG. 1, the editing application 43 is, for example, an application for preparing and editing image data and document data, for example. The editing application 43 is, for example, Microsoft Word (registered trademark) and PowerPoint (registered trademark). The editing application 43 may also be an application that is provided by the vendor of the printer 2, and the like. The editing application 43 is configured to receive a user operation including an instruction to cause the printer 2 to perform a predetermined operation. Specifically, the editing application 43 is configured to receive a print instruction to cause the printer 2 to execute printing via the UI 20, for example.

Note that, each processing and step of the flowcharts of the embodiments basically indicate processing of the CPU 11 according to commands described in the program such as the auxiliary program 42. That is, in descriptions below, the processing "determination", "extraction", "selection", "calculation", "decision", "specifying", "acquisition", "reception", "control" and the like indicates the processing of the CPU 11. The processing that is executed by the CPU 11 includes hardware control using an API of the OS 21. In the present specification, operations of each program are describe while omitting the detailed descriptions of the OS 21. That is, in descriptions below, the description "a program B controls a hardware C" may indicate that "program B controls the hardware C by using an API of the OS 21". Also, the processing of the CPU 11 according to commands described in the program may be described in omitted wording. For example, a description may be made with omitting a program, such as "CPU 11 performs". Also, the processing of the CPU 11 according to commands described in the program may be described in CPU-omitted wording, such as "program A performs".

Note that, "acquisition" is used as a concept that a request is not essential. That is, the processing of receiving data without a request of the CPU 11 is also included in a concept "CPU 11 acquires data". Also, "data" in the present specification is indicated by a computer-readable bit string. Data that have substantially the same meaning or contents but have different formats are treated as the same data. The same applies to "information" in the present specification. Also, "request" and "instruct" are concepts indicating that information indicative of a request and information indicative of an instruction are output to the other party. Also, the information indicative of a request and the information indicative of an instruction are simply referred to as "request" and "instruction".

Also, the processing of the CPU 11 of determining whether information A indicates a matter B may be conceptually described such as "it is determined from the information A whether it is the matter B". The processing of the CPU 11 of determining whether the information A indicates the matter B or a matter C may be conceptually described such as "it is determined from the information A whether it is the matter B or the matter C".

Subsequently, the duplex printing is described. The duplex printing is a print aspect of performing printing two surfaces of a front surface and a back surface of a sheet. When automatically performing the duplex printing, the printer 2 conveys a sheet pulled out from a sheet feeding tray along a printing path, and prints an image on a back surface (a lower surface when the sheet is accommodated in the sheet feeding tray) of the sheet by a printing unit. The printer reverses the conveying direction of the sheet and prints an image on the front surface of the sheet before the sheet on the back surface of which the printing has been completed is discharged to a sheet discharge tray. Since the duplex printing is performed in a state where the sheet is turned upside down by reversing the conveying direction, the sheet discharged to the sheet discharge tray is in a state where the image printed on the front surface is inverted by 180° with respect to the image printed on the back surface.

Subsequently, the one-sheet conveying method, the two-sheet simultaneous conveying method, and the interleave method are described. The one-sheet conveying method is a conveying method that is used in a printing procedure of performing printing on both surfaces of one sheet and then starting printing on a next sheet. In the one-sheet conveying method, after printing on both surfaces of one sheet is completed, the printer feeds a next sheet. That is, in the one-sheet conveying method, while conveying one sheet, the printer does not convey another sheet. Also, the printer first performs printing on the back surface (second page) and then on the front surface (first page). Therefore, the printer in which the one-sheet conveying method is adopted executes duplex printing in order of one surface (second page) of a first sheet the other surface (first page) of the first sheet, one surface (fourth page) of a second sheet, and the other surface (third page) of the second sheet.

The two-sheet simultaneous conveying method is a conveying method that is used in a printing procedure of starting printing on a next sheet after one surface (back surface) of a sheet is printed and before the other surface (front surface) of the sheet is started. In the duplex printing that is performed by the two-sheet simultaneous conveying method, the printer conveys a first sheet to a printing path and performs printing on a back surface of the first sheet. Then, the printer reverses the conveying direction of the first sheet, and performs printing on a back surface of a second sheet before performing printing on a front surface of the first sheet. Then, the printer performs printing on the front surface of the first sheet, and discharges the first sheet onto the sheet discharge tray. Thereafter, the printer performs printing on a front surface of the second sheet, and then discharges the second sheet onto the sheet discharge tray, similar to the first sheet. Therefore, in the two-sheet simultaneous conveying method, there is a timing in which the two sheets on which printing is not completed are conveyed at the same time.

In the two-sheet simultaneous conveying method, the printer performs printing on a next third sheet after the duplex printing for both the first sheet and the second sheet is completed. Specifically, when performing the duplex printing by the two-sheet simultaneous conveying method, the printer performs printing in order of one surface (second page) of a first sheet, one surface (fourth page) of a second sheet, the other surface (first page) of the first sheet, the other surface (third page) of the second sheet, and one surface (sixth page) of a third sheet.

Note that, in the interleave method, sheets are conveyed in a similar method to the two-sheet simultaneous conveying method, except that the first sheet and the third sheet are conveyed on the printing path while the conveying direction is reversed and the second sheet is conveyed. When performing the duplex printing by the interleave method, the printer performs printing in order of one surface (second page) of a first sheet, one surface (fourth page) of a second sheet, the other surface (first page) of the first sheet, one surface (sixth page) of a third sheet, the other surface (third page) of the second sheet, one surface (eighth page) of a fourth sheet, and the other surface (fifth page) of the third sheet, for example.

Subsequently, an example of the printing procedure including operations of the auxiliary program 42 of the present aspect is described with reference to a sequence diagram of FIG. 3. The PC1 of the present aspect can cause the printer 2 to perform the duplex printing by using the auxiliary program 42. The general-purpose print program 41 of the present aspect may not support the duplex printing.

First, the editing application 43 receives a designation on an image of a print target and an instruction input of print execution via the UI 20 (arrow A). The editing application 43 receives an instruction, which instructs a document edited by the editing application 43, a photograph read by the editing application 43 or the like as an image of a print target, for example. The editing application 43 that has received the print instruction transfers a print execution notification, which indicates contents of the received print instruction, to the OS 21. Note that, the operations of the OS 21 are omitted in FIG. 3.

When the OS 21 receives the print execution notification using the general-purpose print program 41, the OS 21 executes the general-purpose print program 41, and transfers the print execution notification to the general-purpose print program 41 (arrow B). The general-purpose print program 41 can acquire a variety of information included in the print instruction, for example, information indicative of a printer caused to perform printing, information indicative of a print setting set by the editing application 43, and information indicative of image data that is a print target, by the print execution notification.

The general-purpose print program 41 specifies a printer designated as an apparatus for performing printing based on the information included in the print execution notification. In a case where a designated printer is the printer 2, since the auxiliary program 42 corresponding to the printer 2 is stored in the memory 12, the general-purpose print program 41 outputs an execution command for processing of the auxiliary program 42 and operates the auxiliary program 42 (arrow C). That is, when the general-purpose print program 41 detects the print execution notification, the general-purpose print program 41 outputs the execution command to the auxiliary program 42.

The auxiliary program 42 executes a variety of processing based on contents of the execution command from the general-purpose print program 41. In the execution command of the arrow C, the general-purpose print program 41 transfers the print setting received by the editing application 43 to the auxiliary program 42, and requests verification of the print setting.

The auxiliary program 42 verifies the print setting based on the execution command of the arrow C (arrow D). The auxiliary program 42 determines whether the received print setting is suitable for the printer 2. For example, when the print setting includes an unsuitable option, such as a sheet size that is not set for the printer 2, the auxiliary program 42 invalidates the print setting.

The auxiliary program 42 of the present aspect can receive settings of changing and adding a print setting during the processing of the arrow D. In the below, a case where the auxiliary program 42 receives a setting for the duplex printing in the processing of the arrow D is described. That is, the print setting that is transferred in the processing of the arrow C does not include a setting for the duplex printing, and the print setting upon completion of the processing of the arrow D includes a setting for the duplex printing.

Note that, in a case where a setting for the duplex printing can be received by the editing application 43, a setting for the duplex printing may be included in the print setting that is transferred to the auxiliary program 42 in the processing of the arrow C. For example, in a case where the general-purpose print program 41 supports the duplex printing, the print setting including a setting for the duplex printing may be transferred to the auxiliary program 42 in the processing of the arrow C. Alternatively, even in a case where the general-purpose print program 41 does not support the duplex printing, a setting for the duplex printing may be transferred from the editing application 43 to the auxiliary program 42 via a storage area that can be commonly used between the editing application 43 and the auxiliary program 42, for example.

For example, the auxiliary program 42 displays a print setting screen corresponding to functions of the printer 2 by using the UI 20. The auxiliary program 42 receives a setting for the duplex printing via the print setting screen. For example, the print setting screen includes, as basic setting items, a sheet type, a sheet size, a direction of printing, a selection on duplex printing, a selection on booklet printing, and the like.

When the duplex printing is selected, the auxiliary program 42 further displays an item for setting a binding method and an item for setting a binding margin by using the UI 20. The binding method includes a long-side binding and a short-side binding for each of a case where a direction of printing is set as "vertical", as shown in section (A) of FIG. 6, and a case where a direction of printing is set as "horizontal", as shown in section (A) of FIG. 7, for example. The long-side binding is a method of binding long sides of sheets, as shown in section (B) of FIG. 6 and section (B) of FIG. 7. The short-side binding is a method of binding short sides of sheets, as shown in section (C) of FIG. 6 and section (C) of FIG. 7. The binding margin is a margin for binding duplex printed sheets. An amount X of the binding margin can be arbitrarily set within a predetermined range. When an OK button displayed on the UI 20 is operated in a state where the binding method and the binding margin are set, the auxiliary program 42 receives the setting for the duplex printing.

Figure 3:
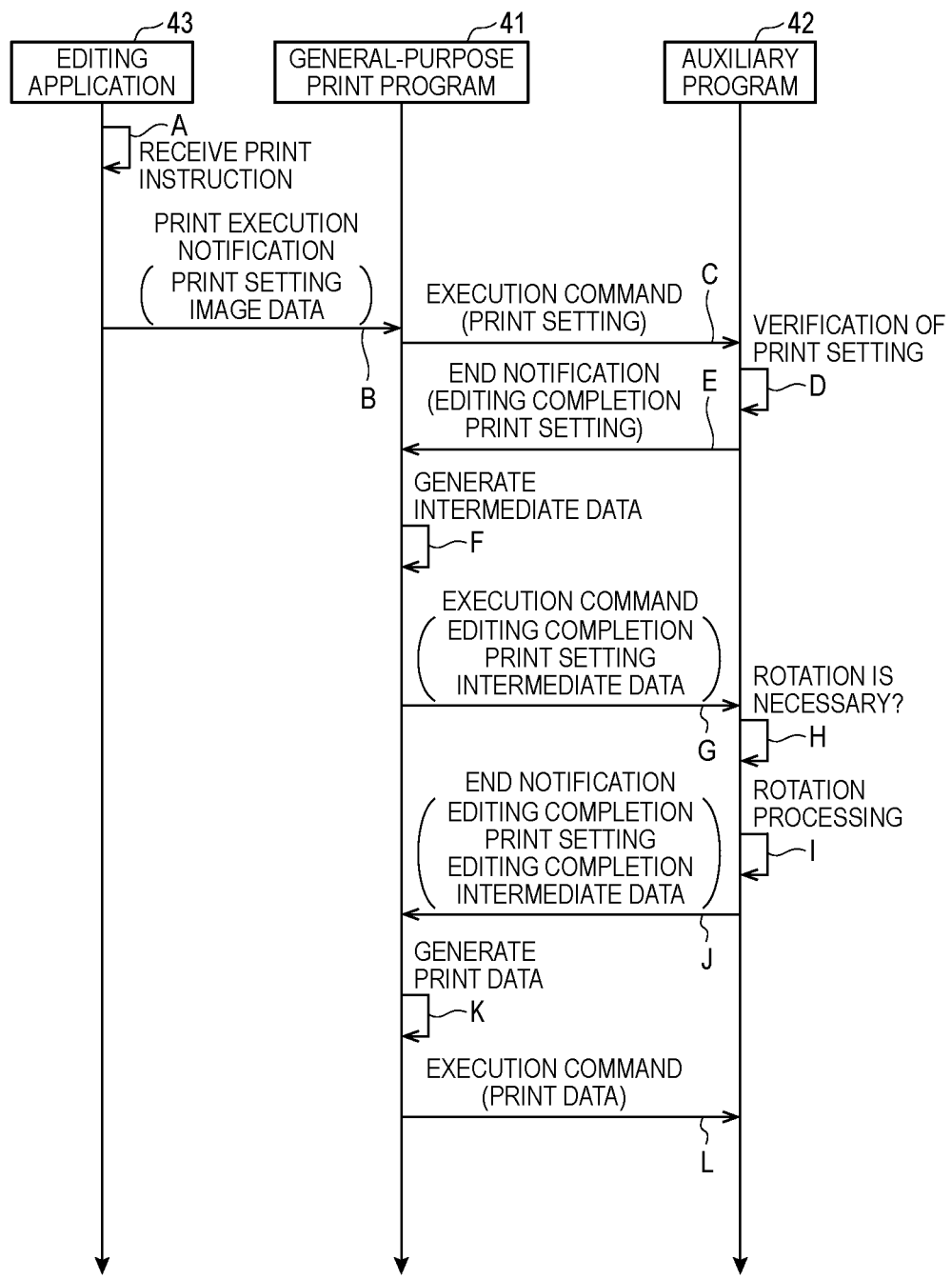
FIG. 3 is a sequence diagram for illustrating an example of a sequence of operations of a first aspect.

As shown in FIG. 3, when the auxiliary program 42 receives the setting for the duplex printing, the auxiliary program 42 edits the print setting attached to the execution command to include the received setting for the duplex printing. Thereby, for example, even when a setting for the duplex printing cannot be performed by the editing application 43, it is possible to perform a setting for the duplex printing suitable for the printer 2 by the auxiliary program 42.

When the auxiliary program 42 completes the verification of the print setting, the auxiliary program 42 transfers an end notification to the general-purpose print program 41 (arrow E). An editing completion print setting including the setting for the duplex printing is attached to the end notification.

Figure 5:
FIG. 5 illustrates handling of data.

The general-purpose print program 41 converts a format of the image data included in the print execution notification into a format of intermediate data to generate intermediate data, and generates a print job including the intermediate data (arrow F). The image data included in the editing application 43 is of various formats, and the general-purpose print program 41 converts the received image data into intermediate data suitable for generation of print data. Note that, when the image data included in the print execution notification is data suitable for generation of print data, the generation of the intermediate data may be omitted and the image data may be used as the intermediate data, as it is. The intermediate data is XPS data, for example. Note that, the intermediate data is an example of the intermediate print data. Note that, for example, as shown in section (A) of FIG. 5, a page order of the intermediate data generated in the processing of the arrow F is the same as a page order of the image data attached to the print execution instruction.

The general-purpose print program 41 that has received the end notification transfers an execution command to execute editing of the intermediate data to the auxiliary program 42 (arrow G). The editing completion print setting and the intermediate data generated in the processing of the arrow F are attached to the execution command. Note that, the intermediate data that the auxiliary program 42 receives from the general-purpose print program 41 in the processing of the arrow G is an example of the first data.

The auxiliary program 42 determines whether it is necessary to rotate the image data of pages included in the print job (arrow H). For example, the auxiliary program 42 determines whether it is necessary to rotate the image data, based on the editing completion print setting. That is, as shown in section (B) of FIG. 6, in a case where the direction of printing is "vertical" and the binding method is "long-side binding", directions of an image to be printed on a front surface and an image to be printed on a back surface of each sheet are preferably matched. Also, as shown in section (C) of FIG. 7, in a case where the direction of printing is "horizontal" and the binding method is "short-side binding", directions of an image to be printed on a front surface and an image to be printed on a back surface of each sheet are preferably matched. As described above, when reversing a sheet and performing the duplex printing, an image printed on the front surface of the sheet is inverted by 180° with respect to an image printed on the back surface. Therefore, when the binding method is the above setting, the auxiliary program 42 determines that it is necessary to rotate the image data.

Figure 6:
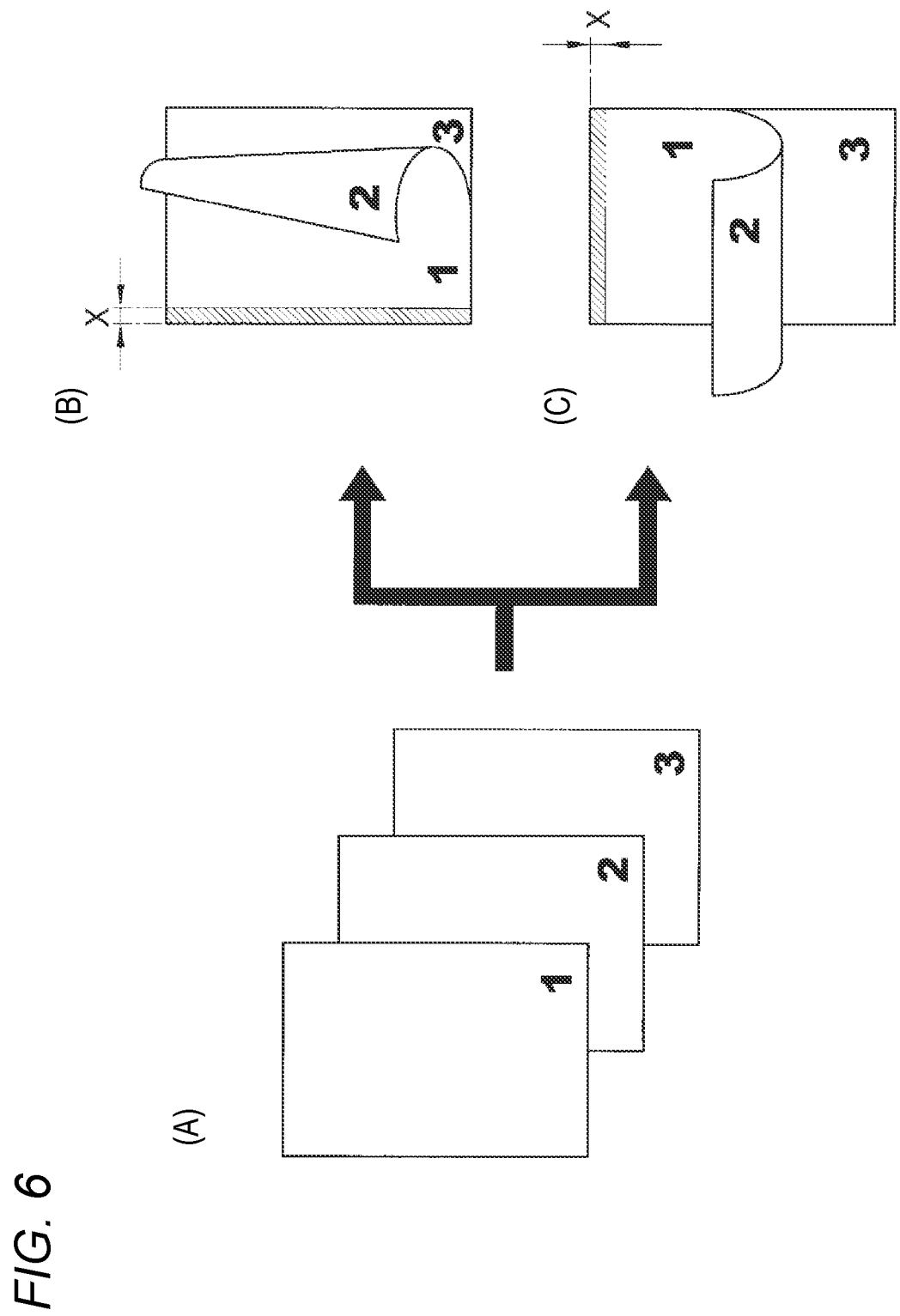
FIG. 6 illustrates rotation conditions.

In contrast, as shown in section (C) of FIG. 6, in a case where the direction of printing is "vertical" and the binding method is "short-side binding", directions of an image to be printed on a front surface and an image to be printed on a back surface of each sheet are preferably inverted by 180°.

Figure 7:
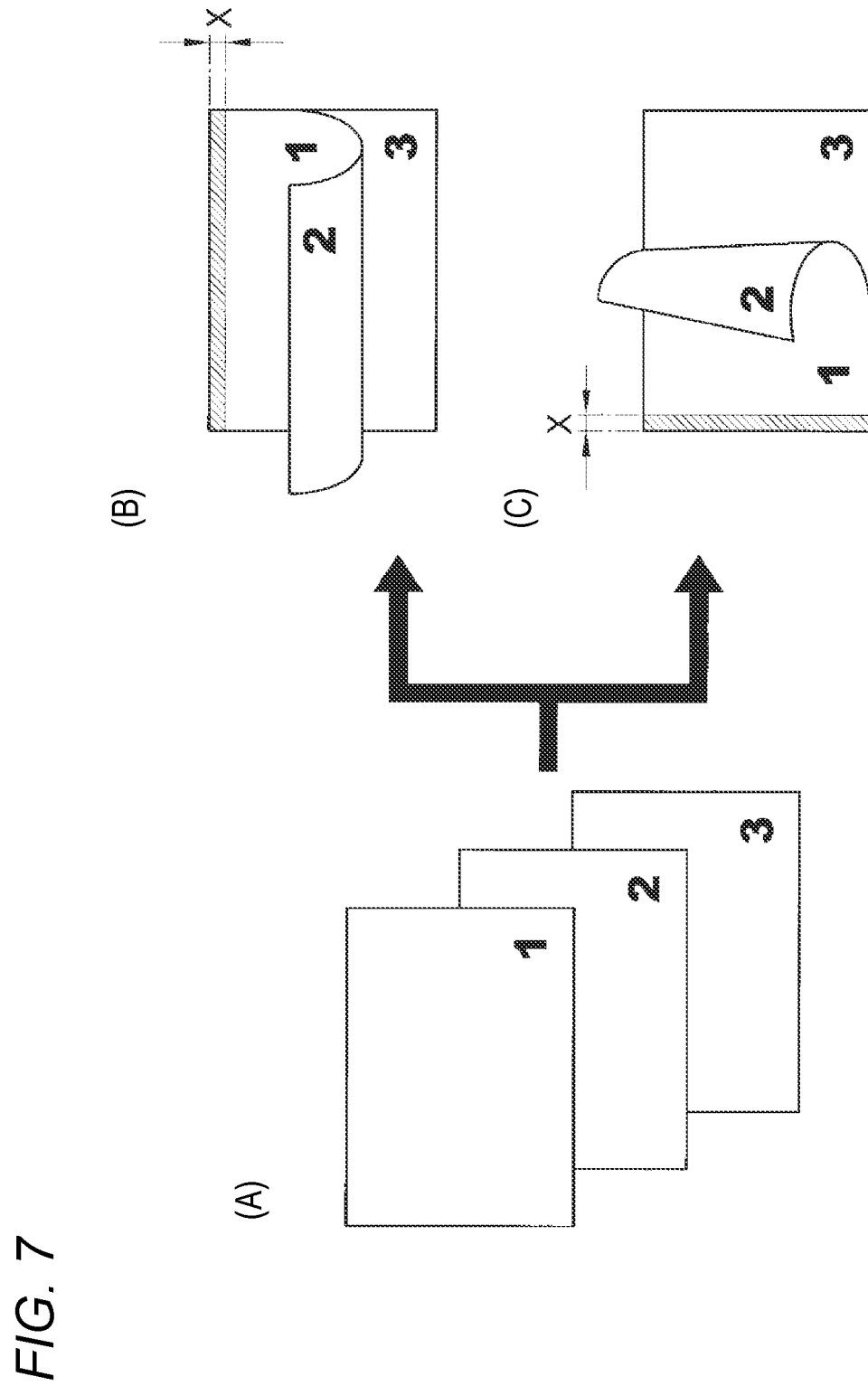
FIG. 7 illustrates rotation conditions.

Also, for example, as shown in section (B) of FIG. 7, in a case where the direction of printing is "horizontal" and the binding method is "long-side binding", directions of an image to be printed on a front surface and an image to be printed on a back surface of each sheet are preferably inverted by 180°. Therefore, when the binding method is the above setting, the auxiliary program 42 determines that it is not necessary to rotate the image data.

As shown in FIG. 3, when the auxiliary program 42 determines that it is necessary to rotate the image data, the auxiliary program 42 executes rotation processing (arrow I). The processing of the arrow I is an example of the rotation processing. For example, as shown in section (B) of FIG. 5, the auxiliary program 42 rotates the intermediate data of even pages by 180° and edits the intermediate data. Note that, the rotation target may also be image data of odd pages.

As shown in FIG. 3, the auxiliary program 42 that has executed the rotation processing outputs the end notification to the general-purpose print program 41 with the editing completion print setting and the editing completion intermediate data for which the rotation processing has been executed being attached to the end notification (arrow J).

On the other hand, when the auxiliary program 42 determines that it is not necessary to rotate the image data, the auxiliary program 42 outputs the end notification to the general-purpose print program (arrow J) without executing the rotation processing shown with the arrow I. In this case, the editing completion intermediate data for which the rotation processing has not been executed is attached to the end notification.

The general-purpose print program 41 that has received the end notification rasterizes the editing completion print setting and editing completion intermediate data attached to the end notification to generate print data (arrow K). The print data that is generated by the general-purpose print program 41 is print data having a format that can be used for printing in a variety of printers. The print data is, for example, PWG Raster data or PDF data. When the general-purpose print program 41 receives the intermediate data of which even pages are rotated by 180° as shown in section (B) of FIG. 5 from the auxiliary program 42, the print data generated by the general-purpose print program 41 is print data of which even pages are rotated by 180°, as shown in section (C) of FIG. 5.

As shown in FIG. 3, after generating the print data, the general-purpose print program 41 outputs an execution command to execute processing of editing the generated print data (arrow L). The print data is attached to the execution command. Note that, the print data that the auxiliary program 42 receives from the general-purpose print program in the processing of the arrow L is an example of the second data.

Figure 4:
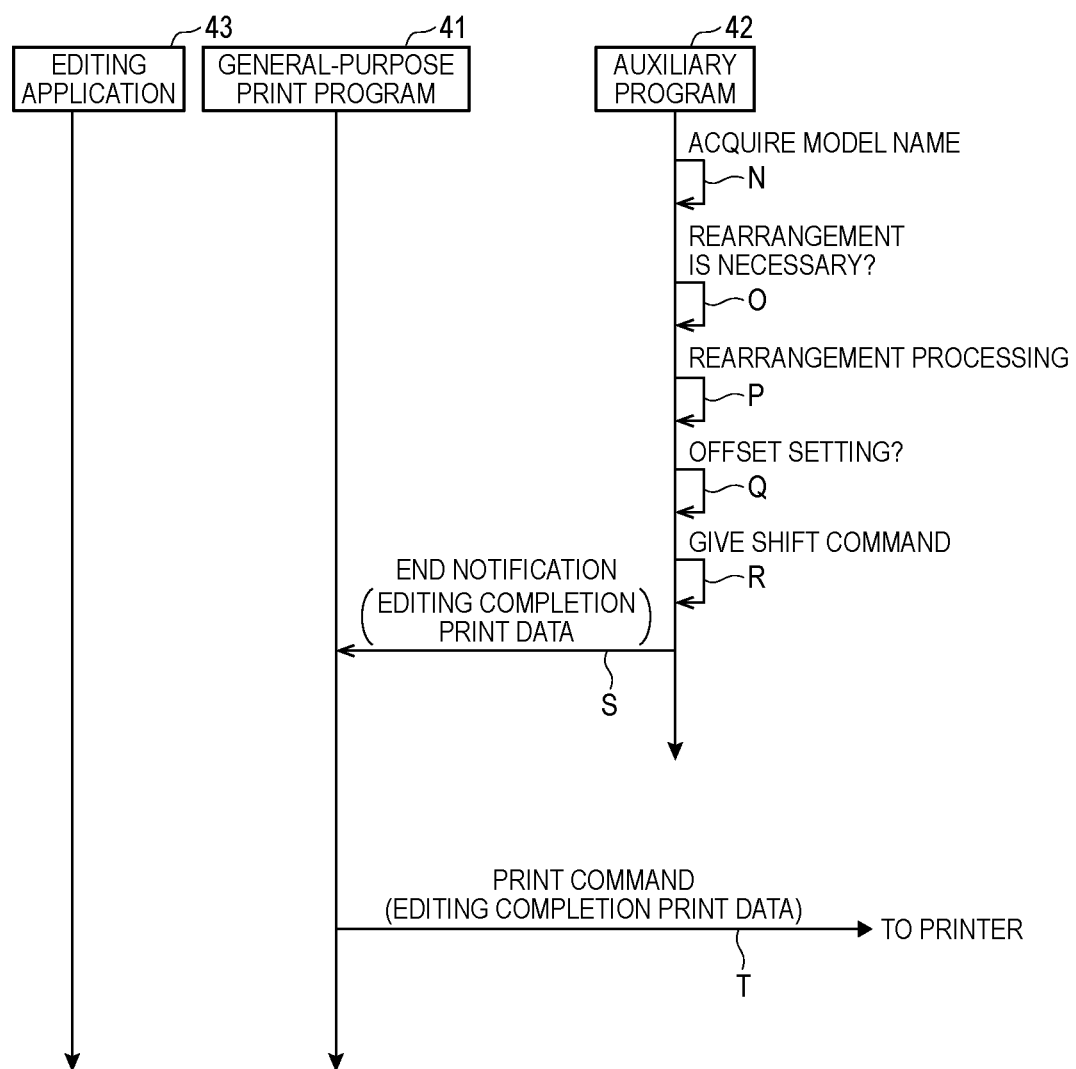
FIG. 4 is a sequence diagram for illustrating an example of the sequence of operations of the first aspect.

After the processing of the arrow L, the auxiliary program 42 acquires a model name (arrow N), as shown in FIG. 4. That is, for example, the auxiliary program 42 inquires the OS 21 of the model name of the printer 2 and acquires the model name of the printer 2 from the OS 21. The model name may also be directly inquired and acquired from the printer 2. The processing of the arrow N is an example of the model acquisition processing. Note that, the model name may also be acquired when activating the auxiliary program 42.

The auxiliary program 42 determines whether it is necessary to rearrange the image data based on the acquired model name (arrow O). That is, for example, in a case where the model name acquired in the processing of the arrow N is "M1", the auxiliary program 42 determines that it is necessary to rearrange the image data because "necessity" is stored in the rearrangement necessity/unnecessity information associated with the model name "M1" of the auxiliary DB 44, as shown in FIG. 2.

The auxiliary program 42 having determined that it is necessary to rearrange the image data executes rearrangement processing (arrow P). That is, the auxiliary program 42 refers to the auxiliary DB 44, specifies the conveying method based on the model name acquired in the processing of the arrow N, and rearranges a processing order of the image data according to the specified conveying method. Then, the auxiliary program 42 executes processing of an arrow Q.

The rearrangement processing is specifically described. In a case where the model name acquired in the processing of the arrow N is "M1", the auxiliary program 42 extracts "one-sheet conveying method" associated with the model name "M1" from the auxiliary DB 44. Accordingly, as shown in section (D) of FIG. 5, the auxiliary program 42 rearranges the processing order "1 page, 2 page, 3 page . . . " defined by the page order of the print job to "2 page, 1 page, 4 page, 3 page . . . " in accordance with the print order of the one-sheet conveying method. Note that, in a case where the specified conveying method is "two-sheet simultaneous conveying method", the auxiliary program 42 rearranges the processing order defined by the page order of the print job to the print order "2 page, 4 page, 1 page, 3 page . . . " of the two-sheet simultaneous conveying method, as shown in section (E) of FIG. 5.

In contrast, in a case where the model name acquired in the processing of the arrow N is "M3", the auxiliary program 42 determines that the rearrangement necessity/unnecessity information is "unnecessity". In this case, since the rearrangement is performed by the printer 2, the auxiliary program 42 determines that it is not necessary to rearrange the image data, and performs processing of the arrow Q without performing the rearrangement processing of the arrow I.

In the processing of the arrow Q, the auxiliary program 42 determines whether there is an offset setting. For example, in a case where a setting for the binding margin is performed in the processing of the arrow D, it is determined that there is an offset setting, and in a case where a setting for the binding margin is not performed in the processing of the arrow D, it is determined that there is no offset setting. In a case where it is determined that there is an offset setting, the auxiliary program 42 adds a shift command to the print data (arrow R). The shift command is a command to shift image data of an image to be printed on a sheet to a side opposite to a side that is to be bound. The shift command includes the amount X of the binding margin.

The auxiliary program 42 outputs an end notification when the editing processing of the print data is over (arrow S). The editing completion print data, for which the rearrangement processing has been executed and the shift command has been given, for example, is attached to the end notification. The general-purpose print program 41 that has received the end notification transmits a print command relating to the print job to the printer 2 designated in the print instruction (arrow T). The editing completion print data relating to the print job is attached to the print command. Note that, the processing of the arrow S and the arrow T is an example of the output processing.

The printer 2 that has received the print command performs the duplex printing in accordance with the editing completion print data. As shown in section (D) of FIG. 5, in the editing completion print data, the processing order of images is rearranged according to the one-sheet conveying method of the printer 2. Therefore, the printer 2 can implement the duplex printing even without storing the print data in the memory and rearranging the image data. Also, in a case where the editing completion print data includes the shift command, the printer 2 performs printing with offsetting a printing position of the image data according to the amount X of the binding margin included in the shift command. Also, for example, in a case where a direction of printing is "vertical" and a binding method is "long-side binding", since the image data of even pages is rotated by 180°, the printer 2 can match directions of images to be printed on the front surface and the back surface, even though the printer 2 itself does not perform the rotation processing.

As described above, in a case where there is a print instruction to the general-purpose print program 41 (OS 21) to cause the printer 2 to execute the duplex printing in a job based on the print instruction, the auxiliary program 42 of the present aspect rotates the image data of the intermediate print data and rearranges the image data of the print data to set the print order according to the sheet conveying aspect of the printer 2. Thereby, the auxiliary program 42 can support the duplex printing even when the general-purpose print program 41 does not support the duplex printing.

Note that, the auxiliary program 42 may acquire the model name, determine whether it is necessary to rearrange the image data and perform the rearrangement processing (arrow N, the arrow O, the arrow P) after receiving the intermediate data in the arrow G in FIG. 3 and before receiving the print data in the arrow L in FIG. 3. That is, the auxiliary program 42 may perform the rearrangement processing for the intermediate data. After receiving the print data shown in the processing of the arrow L shown in FIG. 3, the auxiliary program 42 may determine whether it is necessary to perform the rotation (arrow H) and execute the rotation processing (arrow I). That is, the auxiliary program 42 may execute the rotation processing for the print data. Note that, in this case, the intermediate data that the auxiliary program 42 receives in the processing of the arrow G is an example of the second data, and the print data that the auxiliary program 42 receives in the processing of the arrow L is an example of the first data.

Figure 8:
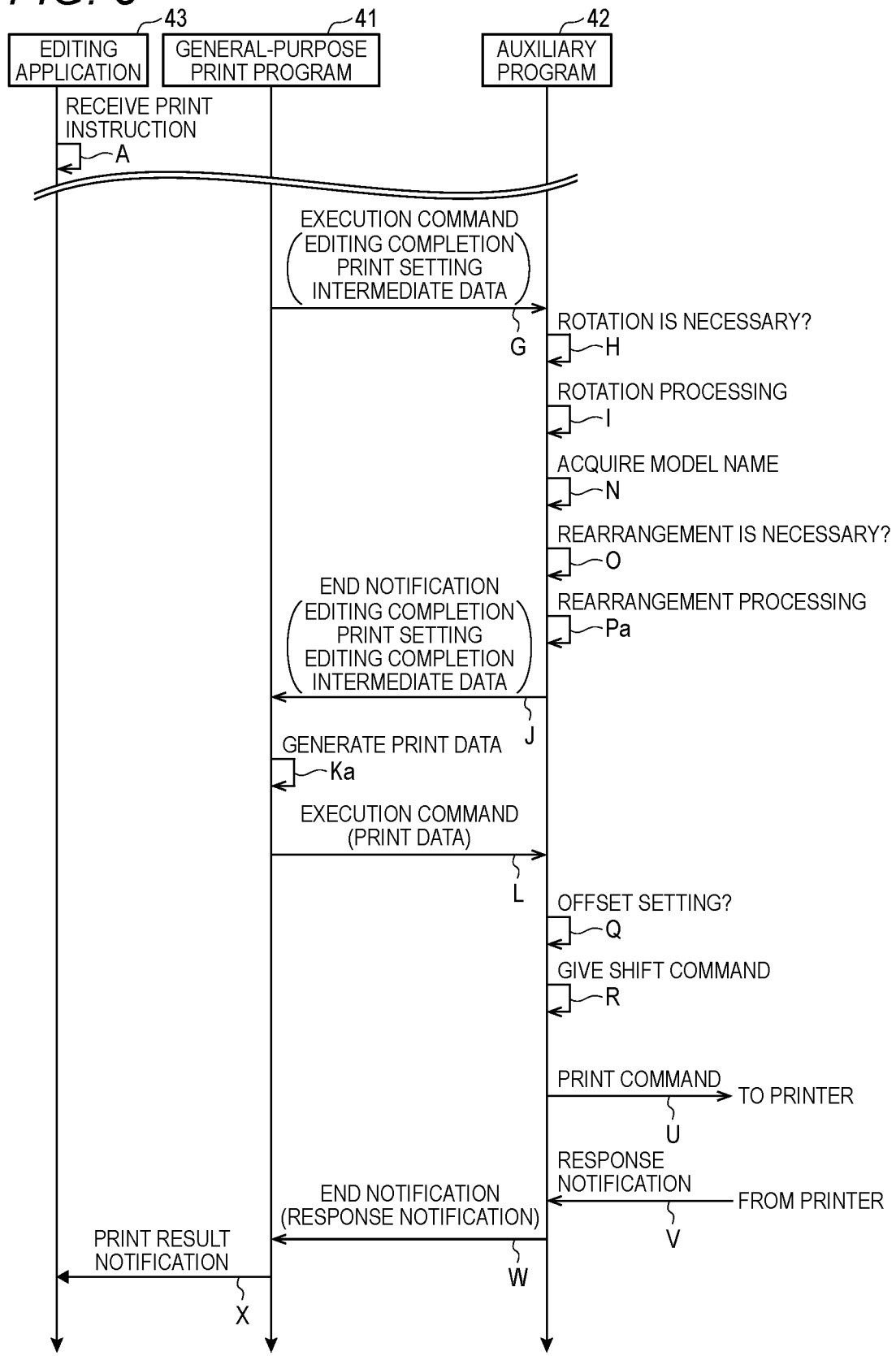
FIG. 8 is a sequence diagram for illustrating an example of a sequence of operations of a second aspect.

Subsequently, a printing procedure including operations of the auxiliary program 42 of a second aspect is described with reference to a sequence diagram of FIG. 8. The second aspect is different from the first aspect, in that both the rotation processing and the rearrangement processing are executed for the intermediate data, and with respect to the output processing of the print data. In descriptions below and FIG. 8, the same processing as the first aspect is denoted with the same reference signs, and the descriptions thereof are omitted as appropriate. Also, the processing that is similar to and is different from the processing of the first aspect is denoted with reference signs having lower-case letters and is described with respect to differences from the first aspect.

The auxiliary program 42 of the second aspect first executes the processing of the arrows A to I. Before the print data is generated in processing of an arrow Ka, the auxiliary program 42 acquires the model name (arrow N). In a case where it is determined that it is necessary to perform rearrangement (arrow O), the auxiliary program 42 executes rearrangement processing (arrow Pa). The processing of the arrow Pa is different from the processing of the arrow P in the first aspect, in that a target of the rearrangement is the intermediate data, and the processing content thereof is the same as the arrow P. The auxiliary program 42 transfers the editing completion intermediate data for which the rotation processing and the rearrangement processing have been implemented as necessary, and the end notification to the general-purpose print program 41 (arrow J). Note that, the processing of the arrows N to Pa may also be executed before the processing of the arrow H.

The general-purpose print program 41 rasterizes the editing completion intermediate data of which image has been rotated or page order has been rearranged by the auxiliary program 42 to generate the print data (arrow Ka), and transfers the print data and an execution command to the auxiliary program 42 (arrow L).

When the auxiliary program 42 receives the print data, the auxiliary program 42 adds a shift command, as necessary (arrow R). The auxiliary program 42 outputs a print command, to which the editing completion print data is attached, to the printer 2. That is, the auxiliary program 42 directly transmits the editing completion print data relating to the print job to the printer 2 without via the general-purpose print program 41 (arrow U).

The auxiliary program 42 may receive a response notification including information such as success in data transmission, completion of printing and error notification from the printer 2 (arrow V), and transfer the same to the general-purpose print program 41 (arrow W). In this case, the general-purpose print program 41 may transfer a print result to the editing application 43 based on the response notification (arrow X). Note that, the processing of the arrow V to the arrow X may also be omitted.

Therefore, since the auxiliary program 42 of the second aspect transmits, to the printer 2, the print data that is based on the intermediate data for which the auxiliary program 42 has executed the rotation processing and the rearrangement processing, the operational effects that are similar to the first aspect are achieved. Note that, the processing of the arrow Pa of FIG. 8 is an example of the rearrangement processing, the processing of the arrow I is an example of the rotation processing, and the processing of the arrow U is an example of the output processing. The intermediate data that the auxiliary program 42 receives from the general-purpose print program 41 in the processing of the arrow G is an example of the intermediate print data.

Subsequently, a printing procedure including operations of the auxiliary program 42 of a third aspect is described with reference to a sequence diagram of FIG. 9. The third aspect is different from the first aspect, in that both the rotation processing and the rearrangement processing are executed for the print data generated by the general-purpose print program 41. In descriptions below and FIG. 9, the same processing as the first aspect is denoted with the same reference signs, and the descriptions thereof are omitted as appropriate. Also, the processing that is similar to and is different from the processing of the first aspect is denoted with reference signs having lower-case letters and is described with respect to differences from the first aspect.

The auxiliary program 42 of the third aspect first executes the processing of the arrows A to F. The general-purpose print program 41 rasterizes the intermediate data generated in the processing of the arrow F to generate print data (arrow Kb), and transfers the same to the auxiliary program 42 (arrow L). That is, the auxiliary program 42 receives the print data for which neither the rotation processing nor the rearrangement processing has been implemented from the general-purpose print program 41. The auxiliary program 42 determines whether it is necessary to perform rotation based on the editing completion print setting included in the received print data (arrow H). In a case where it is determined that it is necessary to perform rotation based on the editing completion print setting included in the received print data, the auxiliary program 42 performs the rotation processing for the print data (arrow Ib). The processing of the arrow Ib is different from the processing of the arrow I of the first aspect, in that a target of the rotation processing is the print data, and the content of the processing is the same as the arrow I. The auxiliary program 42 further executes processing of arrows N to T.

Therefore, since the auxiliary program 42 of the third aspect transmits, to the printer 2, the print data that is based on the intermediate data for which the auxiliary program 42 has executed the rotation processing and the rearrangement processing, the operational effects that are similar to the first aspect are achieved. Note that, the processing of the arrow P of FIG. 9 is an example of the rearrangement processing, the processing of the arrow Ib is an example of the rotation processing, and the processing of the arrow S and the arrow T is an example of the output processing.

Subsequently, a printing procedure including operations of the auxiliary program 42 of a fourth aspect is described with reference to a sequence diagram of FIG. 10. The fourth aspect is different from the first aspect, in that the auxiliary program generates the print data. In descriptions below and FIG. 10, the same processing as the first aspect is denoted with the same reference signs, and the descriptions thereof are omitted as appropriate. Also, the processing that is similar to and is different from the processing of the first aspect is denoted with reference signs having lower-case letters and is described with respect to differences from the first aspect.

Figure 10:
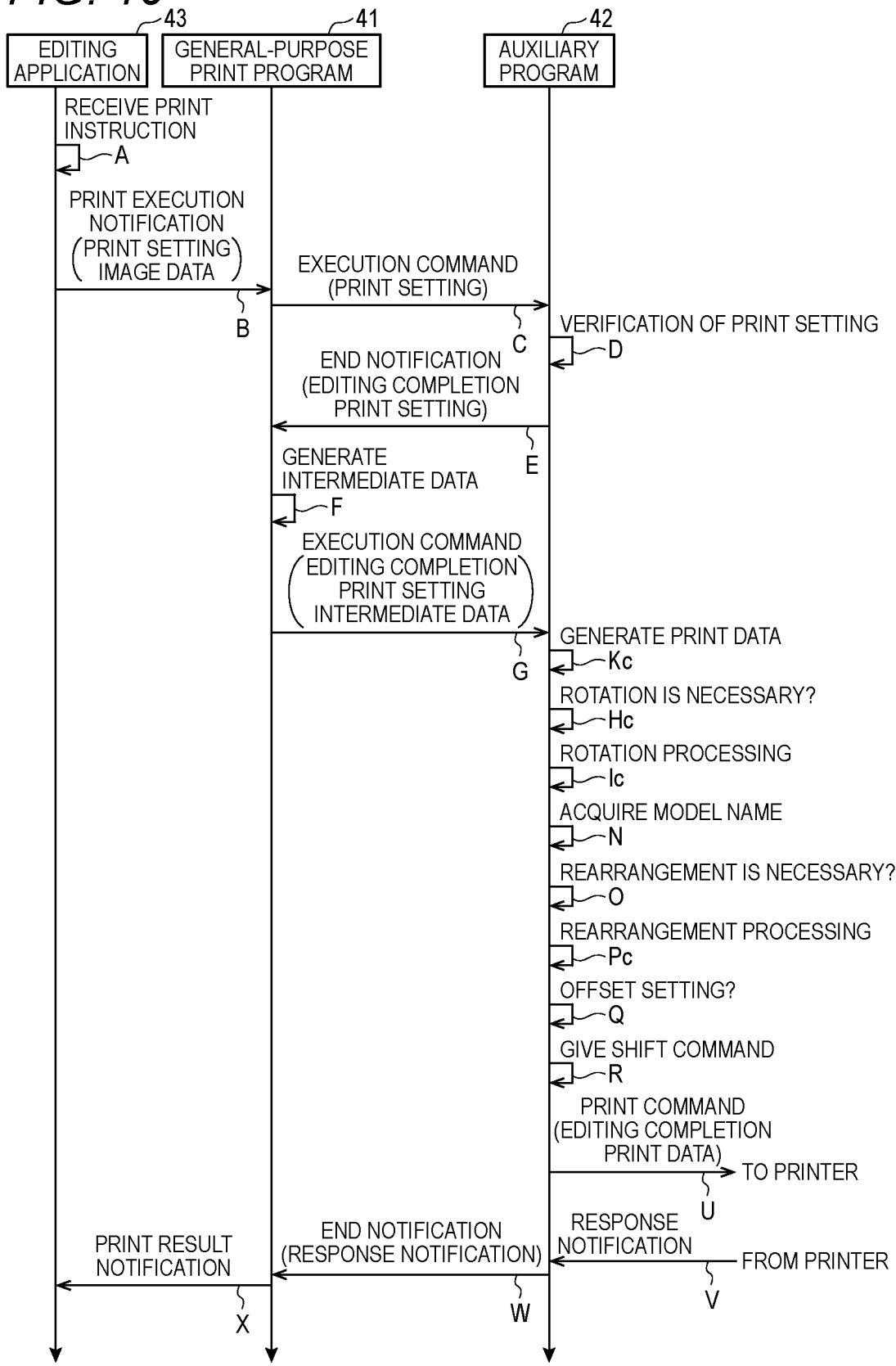
FIG. 10 is a sequence diagram for illustrating an example of a sequence of operations of a fourth aspect.

As shown in FIG. 10, when the processing of the arrow A to the arrow G is executed, the auxiliary program 42 rasterizes the intermediate data received from the general-purpose print program 41 to generate the print data (arrow Kc). The print data that is generated in the processing of the arrow Kc is data having a format that can be printed by the printer 2, and is, for example, PDL data dedicated to the model of the printer 2. The rasterization in the auxiliary program 42 increases a possibility that print data having a higher degree of freedom and more suitable for printing in the printer 2 will be generated, as compared with the rasterization in the general-purpose print program 41. Note that, the print data that is generated in the processing of the arrow Kc may also be data having a format that can be used for printing in another printer, in addition to the model of the printer 2.

The auxiliary program 42 executes the processing of the arrow Hc to the arrow R for the printer data generated by the auxiliary program 42 without using the general-purpose print program 41, and edits the print data. For example, the auxiliary program 42 implements the rotation processing (arrow Ic) and the rearrangement processing (arrow Pc) for the print data generated by the auxiliary program 42, according to the necessity shown in the arrow Hc and the arrow O.

When the auxiliary program 42 edits the print data, the auxiliary program 42 directly transmits the editing completion print data to the printer 2 (arrow U). Since the processing of the arrow U to the arrow X has been described in the second aspect with reference to FIG. 8, the descriptions thereof are omitted. Note that, in FIG. 10, the processing of the arrow G is an example of the acquisition processing, the processing of the arrow Kc is an example of the rasterization processing, the processing of the arrow Ic is an example of the rotation processing, the processing of the arrow Pc is an example of the rearrangement processing, and the processing of the arrow U is an example of the output processing.

Therefore, since the auxiliary program 42 of the fourth aspect performs the rotation processing and the rearrangement processing for the print data generated by the auxiliary program 42 and transmits the print data to the printer 2, it is possible to achieve the operational effects that are similar to the first aspect.

Note that, the auxiliary program 42 may also execute the processing of the arrow Kc between the processing of the arrow Ic and the processing of the arrow N, execute the rotation processing for the intermediate data, generate the print data and then execute the rearrangement processing for the generated print data. Also, for example, the auxiliary program 42 may execute the diverse processing in order of the processing of the arrows N to Pc, the processing of the arrow Kc, and the processing of the arrows Hc and Ic, execute the rearrangement processing for the intermediate data, generate the print data and then execute the rotation processing for the generated print data.

Subsequently, a printing procedure including operations of the auxiliary program 42 of a fifth aspect is described with reference to sequence diagrams of FIGS. 11 and 12. The fifth aspect is different from the first aspect, in that the rotation processing, the rearrangement processing and the output processing are executed in a unit of N pages. In descriptions below and FIGS. 11 and 12, the same processing as the first aspect is denoted with the same reference signs, and the descriptions thereof are omitted as appropriate. Also, the processing that is similar to and is different from the processing of the first aspect is denoted with reference signs having lower-case letters and is described with respect to differences from the first aspect.

Figure 11:
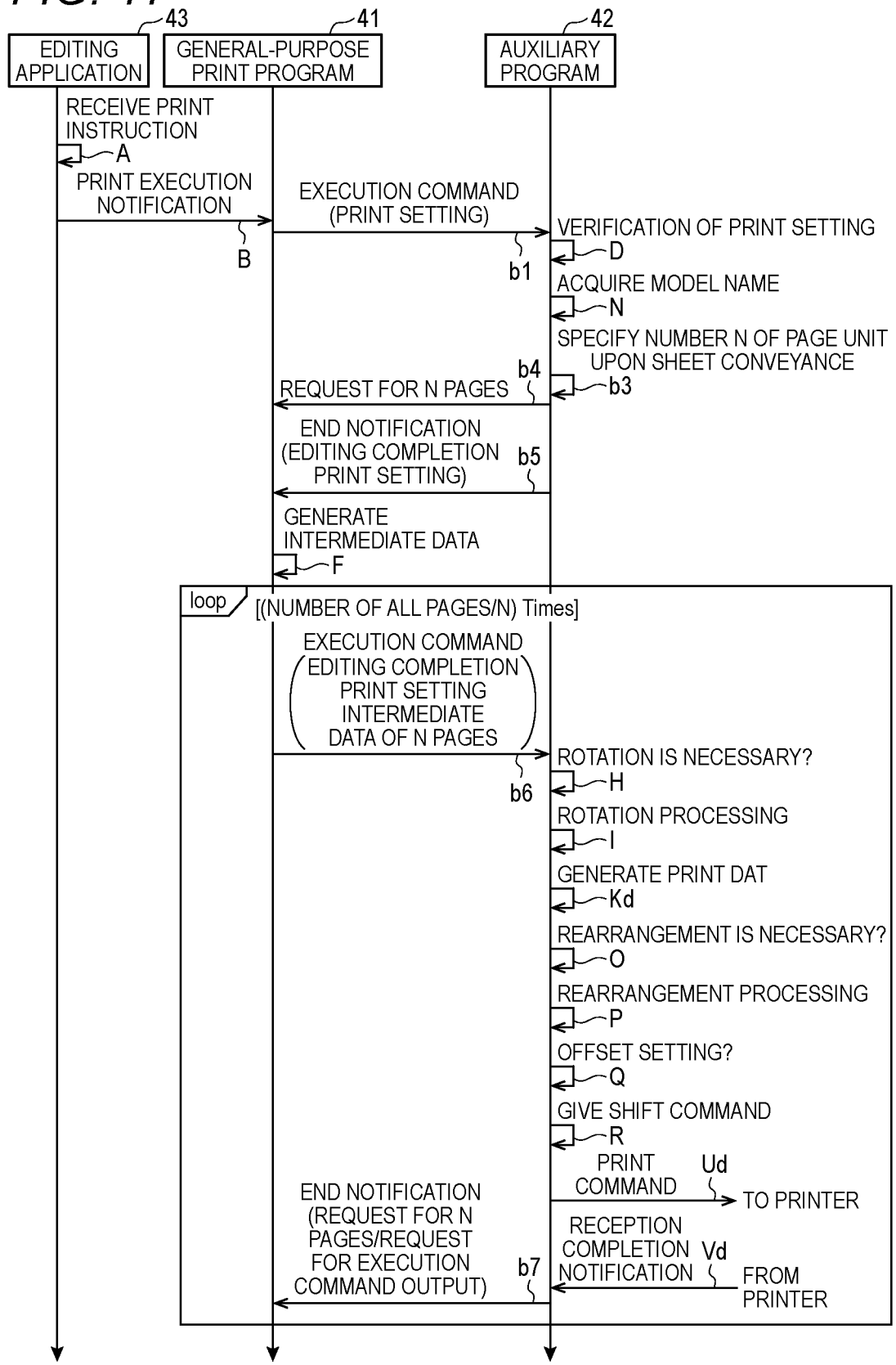
FIG. 11 is a sequence diagram for illustrating an example of a sequence of operations of a fifth aspect.
Figure 12:
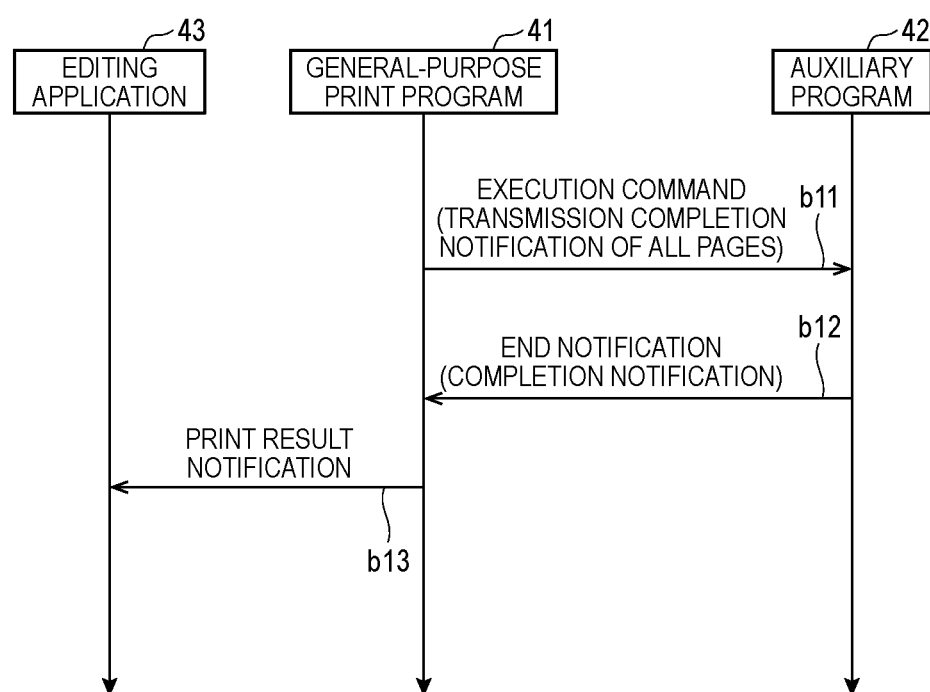
FIG. 12 is a sequence diagram for illustrating an example of the sequence of operations of the fifth aspect.

As shown in FIG. 11, when the general-purpose print program 41 receives the print execution notification from the editing application 43 (arrow B), the general-purpose print program 41 outputs an execution command (arrow b1). The print setting attached to the print execution notification is attached to the execution command.

When the auxiliary program 42 verifies the print setting (arrow D), the auxiliary program 42 acquires the model name (arrow N), and specifies a number N of page unit upon sheet conveyance (arrow b3). For example, the number N of page unit upon sheet conveyance is a value obtained by doubling a number of sheets that exist on the conveying path during the duplex printing, in each conveying method. This is because a print image is formed on each of the front surface and the back surface page by page. That is, in a case where the conveying method is "one-sheet conveying method", N is 2, and in a case where the conveying method is "two-sheet simultaneous conveying method", N is 4.

The auxiliary program 42 that has specified the number N of page unit upon sheet conveyance requests the general-purpose print program 41 to transmit the intermediate data of N pages (arrow b4). Then, the auxiliary program 42 outputs an end notification to which the editing completion print setting is attached to the general-purpose print program 41 (arrow b5). Note that, the processing of the arrow b4 and the arrow b5 may be reversed.

When the general-purpose print program 41 receives the end notification, the general-purpose print program 41 generates the intermediate data (arrow F). Then, the general-purpose print program 41 outputs the execution command (arrow b6). In this case, the general-purpose print program 41 transfers the intermediate data of N pages to the auxiliary program 42 sequentially from a head page (arrow b6). Note that, the editing completion print setting is also attached to the execution command.

When the auxiliary program 42 receives the execution command, the auxiliary program 42 executes the rotation processing for the intermediate data of N pages if rotation is necessary (the arrow H, the arrow I). Then, the auxiliary program 42 rasterizes the intermediate data to generate print data (arrow Kd). In the processing of the arrow Kd, the print data is generated similar to the processing of the arrow Kc shown in FIG. 10. When it is determined that it is necessary to rearrange the generated print data, the auxiliary program 42 executes the rearrangement processing (the arrow O, the arrow P). Also, when there is an offset setting, the auxiliary program 42 gives the shift command to the print data (the arrow Q, the arrow R). Note that, the processing of the arrow Kd may be executed before the processing of the arrow H or after the processing of the arrow P.

Therefore, even when the auxiliary program 42 does not receive collectively the intermediate data relating to the image data of all pages from the general-purpose print program 41, the auxiliary program 42 can receive the intermediate data of N pages from the general-purpose print program 41 and implement the rotation processing and the rearrangement processing for the intermediate data and the print data.

When the print data is edited in this way, the auxiliary program 42 outputs a print command to which the editing completion print data is attached to the printer 2 (arrow Ud), and receives a response notification from a printer that is an output destination of the print command (arrow Vd). The processing of the arrow Ud and the arrow Vd is executed similar to the processing of the arrow U and the arrow V shown in FIG. 8, except that the print data is output in a unit of N pages and a result thereof is received. Note that, the processing of the arrow Ud is an example of the output processing.

When the auxiliary program 42 receives the response end notification, the auxiliary program 42 outputs an end notification to the general-purpose print program 41 (arrow b7). Also, in the processing of the arrow b7, the auxiliary program 42 transfers a request for N pages similar to the processing of the arrow b4 to the general-purpose print program 41. Also, the auxiliary program 42 transfers, to the general-purpose print program 41, an execution command output request for requesting the general-purpose print program 41 to output an execution command.

In a case where the intermediate data of all pages is not transferred to the auxiliary program 42, the general-purpose print program 41 that has received the end notification returns to the processing of the arrow b6, and transfers the intermediate data of next N pages to the auxiliary program 42. The processing of the arrow b6 and thereafter is similar to the above case, and the descriptions thereof are omitted.

When the processing of the arrow b6 to the arrow b7 is executed by the number of times obtained by dividing the number of all pages of the image data included in the print instruction by N, the general-purpose print program 41 transfers the intermediate data of all pages to the auxiliary program 42. In this case, since the general-purpose print program 41 cannot transfer the intermediate data to the auxiliary program 42 even if the general-purpose print program 41 receives the end notification from the auxiliary program 42, the general-purpose print program 41 outputs, to the auxiliary program 42, an execution command to which a transmission completion notification of all pages indicating that transmission of the intermediate data of all pages is completed is attached (arrow b11), as shown in FIG. 12.

The auxiliary program 42 determines that the print job is completed based on the transmission completion notification of all pages, and outputs an end notification to which the completion notification is attached (arrow b12). When the general-purpose print program 41 receives the end notification, the general-purpose print program 41 outputs a print result notification indicative of a print result to the editing application 43 (arrow b13). Thereby, the duplex printing that is based on the print instruction from the editing application 43 is completed.

Therefore, the auxiliary program 42 of the fifth aspect achieves the similar effects to the auxiliary program 42 of the first aspect. The auxiliary program 42 of the fifth aspect further executes the rearrangement and transmission of the print data in a unit of N pages. Thereby, the timing at which the printer 2 starts printing is earlier than a case (for example, refer to FIGS. 3 and 4) where the transmission of the print data starts after the intermediate data of all pages is collectively acquired and the rearrangement of all pages is over. For example, in a case where the printer 2 is a model corresponding to "two-sheet simultaneous conveying method" and the printer 2 is caused to perform duplex printing for documents of 100 pages, the auxiliary program 42 frequently receives the intermediate data of 4 pages from the general-purpose print program 41 and outputs the editing completion print data for which the rotation processing and the rearrangement processing have been executed to the printer 2, without waiting for reception of the intermediate data of 100 pages from the general-purpose print program 41. Therefore, a time period after a user inputs a print instruction to the editing application 43 until the printer 2 starts printing is shortened.

Note that, the present embodiments are just exemplary and are not intended to limit the present invention. Therefore, the present invention can be diversely improved and modified without departing from the spirit of the present invention.

In a case where the auxiliary program 42 is prepared for each model, for example, the auxiliary DB 44 shown in FIG. 1, the processing (arrow N) of acquiring the model name, and the processing (arrow O) of determining whether it is necessary to perform the rearrangement based on the model name (FIG. 4) may be omitted. However, when the auxiliary program 42 acquires the model name, specifies the conveying method based on the auxiliary DB 44, and rearranges the processing order for each model, the auxiliary program 42 can support a plurality of models, which improves the usability.

In the auxiliary DB 44, the rearrangement necessity/unnecessity information is not stored in association with the model name. Also, the auxiliary program 42 may omit the processing of the arrow Q and the arrow R. However, when the processing of the arrow Q and the arrow R is executed, the auxiliary program 42 can support the offset printing, which improves the usability.

In a case where a printer is a model capable of rotating image data, the processing of the arrow H and the arrow I shown in FIGS. 3, 9, 10 and 11 may be omitted. Also, in a case where a printer is a model capable of rearranging image data, the processing of the arrow O and the arrow P shown in FIGS. 3, 9, 10 and 11 may be omitted.

Figure 9:
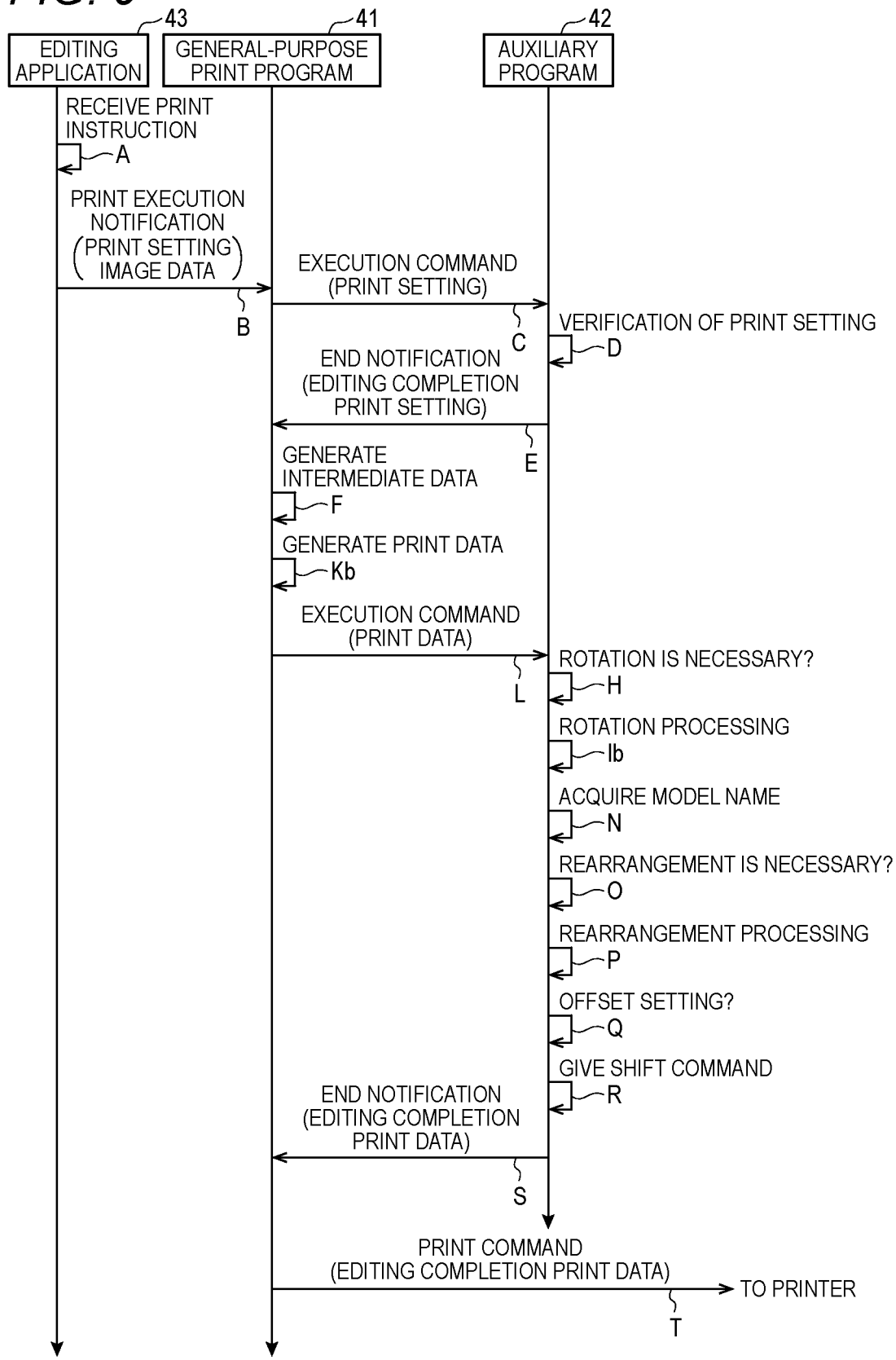
FIG. 9 is a sequence diagram for illustrating an example of a sequence of operations of a third aspect.

The processing of the arrow S and the arrow T shown in FIGS. 4 and 9 may be omitted, and the auxiliary program 42 may directly transmit the editing completion print data to the printer 2. The processing of the arrow U to the arrow X shown in FIGS. 8 and 10 and the processing of the arrow Ud and the arrow Vd shown in FIG. 11 may be omitted, and the print data may be transmitted to the printer via the general-purpose print program 41.

The general-purpose print program 41 may execute the processing of generating the intermediate data shown in the arrow F of FIGS. 3, 9 and 10 after the processing of the arrow B and before the processing of the arrow C.

Note that, the plurality of processing in the plurality of steps in the flowcharts described in the embodiments can be executed by changing the execution order arbitrarily or can be executed in parallel within a scope that does not cause any contradiction in the processing content.

Note that, the processing described in the embodiments can be executed by hardware such as a single CPU, a plurality of CPUs, an ASIC and the like or a combination thereof. Also, the processing described in the embodiments can be implemented in diverse aspects such as a recording medium on which a program for executing the processing is recorded, a method and the like.

What is claimed is:

1. A non-transitory computer readable storage medium that stores a support program executable by a computer included in an information processing device, the support program being corresponding to a printer connected to the information processing device,
  in a case where a print instruction that is output from an application program installed in the information processing device and that causes the printer to execute printing of an image is sent to a general-purpose print program installed in advance in an operating system of the information processing device to cause the printer to execute duplex printing in a job based on the print instruction, the support program causing the computer to execute:
  receiving first data from the general-purpose print program, and rotation processing of executing, for the received first data, image processing of rotating the image of a page required to be rotated by 180°, the first data being one of intermediate print data of the image having a plurality of pages relating to the job and rasterized print data rasterized by the general-purpose print program based on the intermediate print data;
  receiving second data from the general-purpose print program, and rearrangement processing of rearranging a processing order of the second data from a page order to a print order according to a sheet conveying aspect of the printer, the second data being the other of the intermediate print data and the rasterized print data; and
  output processing of outputting processed rasterized print data relating to the job after the rotation processing and the rearrangement processing such that the processed rasterized print data is transmitted from the information processing device to the printer as a transmission destination.

2. The non-transitory computer readable storage medium according to claim 1, comprising a database in which model information indicative of a model of the printer and the sheet conveying aspect of the printer are associated with each other,
  wherein the support program causes the computer to:
    execute model acquisition processing of acquiring model information of the printer connected to the information processing device; and
    in the rearrangement processing, specify the sheet conveying aspect with reference to the database based on the model information acquired in the model acquisition processing, and rearrange the processing order according to the specified sheet conveying aspect.

3. The non-transitory computer readable storage medium according to claim 2, wherein the model information and information indicating whether rearrangement of the processing order is necessary are further associated with each other in the database, and
  wherein the support program causes the computer: to specify whether rearrangement of the processing order is necessary with reference to the database based on the model information acquired in the model acquisition processing; in a case where the printer has a model for which rearrangement of the processing order is necessary, to execute the rearrangement processing; and
  in a case where the printer has a model for which rearrangement of the processing order is not necessary, not to execute the rearrangement processing, and to output the rasterized print data relating to the job to the printer as the transmission destination without rearranging the processing order in the output processing such that the printer that has received the rasterized print data relating to the job determines the print order from the page order of the rasterized print data relating to the job and executes the duplex printing.

4. The non-transitory computer readable storage medium according to claim 2, wherein, in the rearrangement processing, in a case where the printer has a model that conveys sheets in a unit of N pages in the duplex printing, the support program causes the computer to acquire the intermediate print data or the rasterized print data rasterized by the general-purpose print program every N pages and to rearrange the processing order in the unit of N pages, N being a natural number of 2 or greater.

5. The non-transitory computer readable storage medium according to claim 1, wherein, in a case where the printer is caused to execute duplex printing accompanied by an offset in the job based on the print instruction, the support program causes the computer to execute addition processing of adding a shift command to shift the image with respect to the rasterized print data, and to execute causing the printer to print the image shifted according to the shift command in a case where the printer receives the rasterized print data rasterized by the general-purpose print program to which the shift command is added.

6. A non-transitory computer readable storage medium that stores a support program executable by a computer included in an information processing device, the support program being corresponding to a printer connected to the information processing device,
  in a case where a print instruction that is output from an application program installed in the information processing device and that causes the printer to execute printing of an image is sent to a general-purpose print program installed in advance in an operating system of the information processing device to cause the printer to execute duplex printing in a job based on the print instruction, the support program causing the computer to execute:
  receiving intermediate print data of the image having a plurality of pages relating to the job from the general-purpose print program, and for the received intermediate print data, both of rotation processing of executing image processing of rotating the image of a page required to be rotated by 180° and rearrangement processing of rearranging a processing order from a page order to a print order according to a sheet conveying aspect of the printer; and output processing of transferring processed intermediate print data, for which the rotation processing and the rearrangement processing have been executed, to the general-purpose print program such that rasterized print data rasterized by the general-purpose print program relating to the job after the rotation processing and the rearrangement processing is transmitted from the information processing device to the printer as a transmission destination.

7. The non-transitory computer readable storage medium according to claim 6, comprising a database in which model information indicative of a model of the printer and the sheet conveying aspect of the printer are associated with each other,
wherein the support program causes the computer to:
execute model acquisition processing of acquiring model information of the printer connected to the information processing device; and
in the rearrangement processing, specify the sheet conveying aspect with reference to the database based on the model information acquired in the model acquisition processing, and rearrange the processing order according to the specified sheet conveying aspect.

8. The non-transitory computer readable storage medium according to claim 7,
wherein the model information and information indicating whether rearrangement of the processing order is necessary are further associated with each other in the database, and
wherein the support program causes the computer:
to specify whether rearrangement of the processing order is necessary with reference to the database based on the model information acquired in the model acquisition processing;
in a case where the printer has a model for which rearrangement of the processing order is necessary, to execute the rearrangement processing; and
in a case where the printer has a model for which rearrangement of the processing order is not necessary, not to execute the rearrangement processing, and to output the print data relating to the job to the printer as the transmission destination without rearranging the processing order in the output processing such that the printer that has received the print data relating to the job determines the print order from the page order of the received print data and executes the duplex printing.

9. The non-transitory computer readable storage medium according to claim 7, wherein, in the rearrangement processing, in a case where the printer has a model that conveys sheets in a unit of N pages in the duplex printing, the support program causes the computer to acquire the intermediate print data relating to the job every N pages and to rearrange the processing order in the unit of N pages, N being a natural number of 2 or greater.

10. The non-transitory computer readable storage medium according to claim 6, wherein, in a case where the printer is caused to execute duplex printing accompanied by an offset in the job based on the print instruction, the support program causes the computer to execute addition processing of adding a shift command to shift the image with respect to the print data, and to execute causing the printer to print the image shifted according to the shift command in a case where the printer receives the print data relating to the job to which the shift command is added.

11. A non-transitory computer readable storage medium that stores a support program executable by a computer included in an information processing device, the support program being corresponding to a printer connected to the information processing device,
in a case where a print instruction that is output from an application program installed in the information processing device and that causes the printer to execute printing of an image is sent to a general-purpose print program installed in advance in an operating system of the information processing device to cause the printer to execute duplex printing in a job based on the print instruction, the support program causing the computer to execute:
receiving print data rasterized by the general-purpose print program from the general-purpose print program, and for the received print data, both of rotation processing of executing image processing of rotating the image of a page required to be rotated by 180° and rearrangement processing of rearranging a processing order from a page order to a print order according to a sheet conveying aspect of the printer; and
output processing of outputting processed rasterized print data relating to the job after the rotation processing and the rearrangement processing such that the processed rasterized print data relating to the job is transmitted from the information processing device to the printer as a transmission destination.

12. The non-transitory computer readable storage medium according to claim 11, comprising a database in which model information indicative of a model of the printer and the sheet conveying aspect of the printer are associated with each other,
wherein the support program causes the computer to:
execute model acquisition processing of acquiring model information of the printer connected to the information processing device; and
in the rearrangement processing, specify the sheet conveying aspect with reference to the database based on the model information acquired in the model acquisition processing, and rearrange the processing order according to the specified sheet conveying aspect.

13. The non-transitory computer readable storage medium according to claim 12, wherein the model information and information indicating whether rearrangement of the processing order is necessary are further associated with each other in the database, and wherein the support program causes the computer: to specify whether rearrangement of the processing order is necessary with reference to the database based on the model information acquired in the model acquisition processing; in a case where the printer has a model for which rearrangement of the processing order is necessary, to execute the rearrangement processing; and in a case where the printer has a model for which rearrangement of the processing order is not necessary, not to execute the rearrangement processing, and to output the rasterized print data relating to the job to the printer as the transmission destination without rearranging the processing order in the output processing such that the printer that has received the rasterized print data relating to the job determines the print order from the page order of the received rasterized print data and executes the duplex printing.

14. The non-transitory computer readable storage medium according to claim 12, wherein, in the rearrangement processing, in a case where the printer has a model that conveys sheets in a unit of N pages in the duplex printing, the support program causes the computer to acquire the rasterized print data relating to the job every N pages and to rearrange the processing order in the unit of N pages, N being a natural number of 2 or greater.

15. The non-transitory computer readable storage medium according to claim 11, wherein, in a case where the printer is caused to execute duplex printing accompanied by an offset in the job based on the print instruction, the support program causes the computer to execute addition processing of adding a shift command to shift the image with respect to the print data relating to the job, and to execute causing the printer to print the image shifted according to the shift command in a case where the printer receives the print data to which the shift command is added.

16. A non-transitory computer readable storage medium that stores a support program executable by a computer included in an information processing device, the support program being corresponding to a printer connected to the information processing device,
   in a case where a print instruction that is output from an application program installed in the information processing device and that causes the printer to execute printing of an image is sent to a general-purpose print program installed in advance in an operating system of the information processing device to cause the printer to execute duplex printing in a job based on the print instruction, the support program causing the computer to execute:
   acquisition processing of acquiring intermediate print data of the image having a plurality of pages relating to the job from the general-purpose print program;
   rasterization processing of rasterizing the intermediate print data acquired in the acquisition processing to acquire rasterized print data;
   rotation processing of executing, for the intermediate print data or the rasterized print data, image processing of rotating the image of a page required to be rotated by 180°;
   rearrangement processing, for the intermediate print data or the rasterized print data, of rearranging a processing order from a page order to a print order according to a sheet conveying aspect of the printer; and
   output processing of outputting processed rasterized print data relating to the job after the rotation processing and the rearrangement processing such that the processed rasterized print data is transmitted from the information processing device to the printer as a transmission destination.

17. The non-transitory computer readable storage medium according to claim 16, wherein, in a case where the printer is caused to execute duplex printing accompanied by an offset in the job based on the print instruction, the support program causes the computer to execute addition processing of adding a shift command to shift the image with respect to the rasterized print data, and to execute causing the printer to print the image shifted according to the shift command in a case where the printer receives the rasterized print data to which the shift command is added.

18. An information processing device comprising a computer, wherein an operating system of the information processing device has a general-purpose print program installed in advance in the operating system,
   wherein a support program corresponding to a printer connected to the information processing device and an application program to which a print instruction that causes the printer to print an image via the general-purpose print program is capable of being input are installed in the information processing device, and
   wherein, in a case where the print instruction is output from the application program to cause the printer to execute duplex printing in a job based on the print instruction, the computer, when instructed by the support program, executes:
   receiving first data from the general-purpose print program, and rotation processing of executing, for the received first data, image processing of rotating the image of a page required to be rotated by 180°, the first data being one of intermediate print data of the image having a plurality of pages relating to the job and rasterized print data rasterized by the general-purpose print program based on the intermediate print data;
   receiving second data from the general-purpose print program, and rearrangement processing of rearranging a processing order of the second data from a page order to a print order according to a sheet conveying aspect of the printer, the second data being the other of the intermediate print data and the rasterized print data rasterized by the general-purpose print program; and
   output processing of outputting processed rasterized print data relating to the job after the rotation processing and the rearrangement processing such that the processed rasterized print data is transmitted from the information processing device to the printer as a transmission destination.

19. An information processing device comprising a computer,
   wherein an operating system of the information processing device has a general-purpose print program installed in advance in the operating system, wherein a support program corresponding to a printer connected to the information processing device and an application program to which a print instruction that causes the printer to print an image via the general-purpose print program is capable of being input are installed in the information processing device, and
   wherein, in a case where the print instruction is output from the application program to cause the printer to execute duplex printing in a job based on the print instruction, the computer, when instructed by the support program, executes:
   receiving intermediate print data of the image having a plurality of pages relating to the job, and for the received intermediate print data, both of rotation processing of executing image processing of rotating the image of a page required to be rotated by 180° and rearrangement processing of rearranging a processing order from a page order to a print order according to a sheet conveying aspect of the printer; and
   output processing of transferring processed intermediate print data, for which the rotation processing and the rearrangement processing have been performed, to the general-purpose print program such that the rotation and rearrangement processed print data relating to the job after the rotation processing and the rearrangement processing is transmitted from the information processing device to the printer as a transmission destination.

20. An information processing device comprising a computer, wherein an operating system of the information processing device has a general-purpose print program installed in advance in the operating system,
   wherein a support program corresponding to a printer connected to the information processing device and an application program to which a print instruction that causes the printer to print an image via the general-purpose print program is capable of being input are installed in the information processing device, and wherein, in a case where the print instruction is output from the application program to cause the printer to execute duplex printing in a job based on the print instruction, the computer, when instructed by the support program, executes:

receiving print data rasterized by the general-purpose print program, and for the received print data, both of rotation processing of executing image processing of rotating the image of a page required to be rotated by 180° and rearrangement processing of rearranging a processing order from a page order to a print order according to a sheet conveying aspect of the printer; and output processing of outputting processed rasterized print data relating to the job after the rotation processing and the rearrangement processing such that the processed rasterized print data is transmitted from the information processing device to the printer as a transmission destination.

21. An information processing device comprising a computer, wherein an operating system of the information processing device has a general-purpose print program installed in advance in the operating system, wherein a support program corresponding to a printer connected to the information processing device and an application program to which a print instruction that causes the printer to print an image via the general-purpose print program is capable of being input are installed in the information processing device, and wherein, in a case where the print instruction is output from the application program to cause the printer to execute duplex printing in a job based on the print instruction, the computer, when instructed by the support program, executes:

acquisition processing of acquiring intermediate print data of the image having a plurality of pages relating to the job from the general-purpose print program;

rasterization processing of rasterizing the intermediate print data acquired in the acquisition processing to acquire rasterized print data;

rotation processing of executing, for the intermediate print data or the rasterized print data, image processing of rotating the image of a page required to be rotated by 180°;

rearrangement processing, for the intermediate print data or the rasterized print data, of rearranging a processing order from a page order to a print order according to a sheet conveying aspect of the printer; and output processing of outputting the processed rasterized print data relating to the job after the rotation processing and the rearrangement processing such that the processed rasterized print data is transmitted from the information processing device to the printer as a transmission destination.

22. A printing method of causing a printer to execute printing based on print data generated in an information process device, the printer being connected to the information processing device, an operating system of the information processing device having a general-purpose print program installed in advance in the operating system, a support program corresponding to the printer connected to the information processing device and an application program to which a print instruction that causes the printer to print an image via the general-purpose print program is capable of being input being installed in the information processing device, in a case where the print instruction is output from the application program to cause the printer to execute duplex printing in a job based on the print instruction, the printing method, which is executed by the support program, comprising:

receiving first data from the general-purpose print program, and executing, for the received first data, image processing of rotating the image of a page required to be rotated by 180°, the first data being one of intermediate print data of the image having a plurality of pages relating to the job and rasterized print data rasterized by the general-purpose print program based on the intermediate print data;

receiving second data from the general-purpose print program, and rearranging a processing order of the second data from a page order to a print order according to a sheet conveying aspect of the printer, the second data being the other of the intermediate print data and the rasterized print data; and outputting processed rasterized print data relating to the job after the image processing and the rearrangement processing such that the processed rasterized print data is transmitted from the information processing device to the printer as a transmission destination.

23. A printing method of causing a printer to execute printing based on print data generated in an information process device, the printer being connected to the information processing device, an operating system of the information processing device having a general-purpose print program installed in advance in the operating system, a support program corresponding to the printer connected to the information processing device and an application program to which a print instruction that causes the printer to print an image via the general-purpose print program is capable of being input being installed in the information processing device, in a case where the print instruction is output from the application program to cause the printer to execute duplex printing in a job based on the print instruction, the printing method, which is executed by the support program, comprising:

receiving intermediate print data of the image having a plurality of pages relating to the job, and executing, for the received intermediate print data, image processing of rotating the image of a page required to be rotated by 180° and of rearranging a processing order from a page order to a print order according to a sheet conveying aspect of the printer; and transferring processed intermediate print data for which the image processing and the rearrangement processing have been performed to the general-purpose print program such that the image processed print data relating to the job after the image processing and the rearrangement processing is transmitted from the information processing device to the printer as a transmission destination.

24. A printing method of causing a printer to execute printing based on print data generated in an information process device, the printer being connected to the information processing device, an operating system of the information processing device having a general-purpose print program installed in advance in the operating system, a support program corresponding to the printer connected to the information processing device and an application program to which a print instruction that causes the printer to print an image via the general-purpose print program is capable of being input being installed in the information processing device, in a case where the print instruction is output from the application program to cause the printer to execute duplex printing in a job based on the print instruction, the printing method, which is executed by the support program, comprising:

receiving print data rasterized by the general-purpose print program, and executing, for the received print data, image processing of rotating the image of a page required to be rotated by 180° and of rearranging a processing order from a page order to a print order according to a sheet conveying aspect of the printer; and outputting the processed rasterized print data relating to the job after the image processing and the rearrangement processing such that the processed rasterized print data is transmitted from the information processing device to the printer as a transmission destination.

25. A printing method of causing a printer to execute printing based on print data generated in an information process device, the printer being connected to the information processing device, an operating system of the information processing device having a general-purpose print program installed in advance in the operation system, a support program corresponding to the printer connected to the information processing device and an application program to which a print instruction that causes the printer to print an image via the general-purpose print program is capable of being input being installed in the information processing device, in a case where the print instruction is output from the application program to cause the printer to execute duplex printing in a job based on the print instruction, the printing method, which is executed by the support program, comprising:

acquiring intermediate print data of the image having a plurality of pages relating to the job from the general-purpose print program;

rasterizing the acquired intermediate print data to acquire rasterized print data;

executing, for the intermediate print data or the rasterized print data, image processing of rotating the image of a page required to be rotated by 180°;

rearranging, for the intermediate print data or the rasterized print data, a processing order from a page order to a print order according to a sheet conveying aspect of the printer; and outputting processed rasterized print data relating to the job after the image processing and the rearrangement processing such that the processed rasterized print data is transmitted from the information processing device to the printer as a transmission destination.

* * * * *